US010946958B2

(12) United States Patent
Baek et al.

(10) Patent No.: US 10,946,958 B2
(45) Date of Patent: Mar. 16, 2021

(54) UNMANNED AERIAL VEHICLE HAVING DUCT STRUCTURE

(71) Applicant: Samsung Electronics Co., Ltd, Suwon-si (KR)

(72) Inventors: Sangin Baek, Suwon-si (KR); Jaeho Kang, Suwon-si (KR); Seungchul Baek, Hwaseong-si (KR); Jongkeun Kim, Hwaseong-si (KR); Yeonggyu Yoon, Suwon-si (KR); Wonhee Choi, Seoul (KR); Hyungil Kim, Suwon-si (KR); Seunghyun Hwang, Yongin-si (KR); Minwoo Yoo, Osan-si (KR); Byounguk Yoon, Hwaseong-si (KR); Jongchul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 15/915,850

(22) Filed: Mar. 8, 2018

(65) Prior Publication Data

US 2018/0257775 A1    Sep. 13, 2018

(30) Foreign Application Priority Data

Mar. 13, 2017    (KR) .................. 10-2017-0030977

(51) Int. Cl.
*B64C 39/02* (2006.01)
*B64C 27/00* (2006.01)
(Continued)

(52) U.S. Cl.
CPC .......... *B64C 39/024* (2013.01); *B64C 27/006* (2013.01); *B64C 27/20* (2013.01);
(Continued)

(58) Field of Classification Search
CPC ..... B64C 39/024; B64C 27/20; B64C 27/006; B64C 2201/027; B64C 39/001;
(Continued)

(56) References Cited

U.S. PATENT DOCUMENTS 8,328,128 B2 * 12/2012 Wiggerich .............. B64C 27/20
244/17.23
8,328,130 B2 * 12/2012 Goossen ................ B64C 27/20
244/23 A
(Continued)

FOREIGN PATENT DOCUMENTS

EP          3147211 A1 *  3/2017  ............. B64D 27/24
KR    10-2006-0110471 A    10/2006
(Continued)

OTHER PUBLICATIONS

English Translation WO2016166366.*
(Continued)

*Primary Examiner* — Assres H Woldemaryam

(57) ABSTRACT

An unmanned aerial vehicle is disclosed. The unmanned aerial vehicle includes a frame configured to fix a motor. The unmanned aerial vehicle also includes a housing configured to enclose the frame. The housing includes a top mesh corresponding to an upper surface of the housing and a bottom mesh that covers a portion of a bottom surface of the housing. The housing also includes middle part coupled to the top mesh and the bottom mesh. The housing also includes a plurality of duct areas that penetrate each of the top mesh, the bottom mesh, and the middle part. The motor and a propeller connected to the motor and for rotating are positioned within the duct area.

12 Claims, 16 Drawing Sheets

(51) Int. Cl.
*B64C 27/20* (2006.01)
*B64C 39/00* (2006.01)

(52) U.S. Cl.
CPC ...... *B64C 39/001* (2013.01); *B64C 2201/024* (2013.01); *B64C 2201/027* (2013.01); *B64C 2201/108* (2013.01); *B64C 2201/162* (2013.01)

(58) Field of Classification Search
CPC ........ B64C 2201/108; B64C 2201/024; B64C 2201/162; B64C 2201/042; B64C 2201/127; B64C 2201/146; B64C 39/06; B64C 2001/0054; B64C 27/08; B64D 47/08; B64D 45/00; B64D 27/24; Y02T 50/62
See application file for complete search history.

(56) References Cited

U.S. PATENT DOCUMENTS

| | | | |
|---|---|---|---|
| 8,622,335 B2* | 1/2014 | Yoeli | B64C 1/1415 244/12.3 |
| 8,833,692 B2* | 9/2014 | Yoeli | B64C 29/0025 244/23 A |
| 2006/0049304 A1* | 3/2006 | Sanders, Jr. | B64C 39/024 244/23 A |
| 2007/0034738 A1 | 2/2007 | Sanders, Jr. et al. | |
| 2015/0321759 A1 | 11/2015 | Caubel | |
| 2016/0001883 A1 | 1/2016 | Sanz et al. | |
| 2016/0130015 A1* | 5/2016 | Caubel | B64C 27/001 244/120 |
| 2017/0010622 A1 | 1/2017 | Pedersen et al. | |
| 2017/0029097 A1 | 2/2017 | Matsumoto et al. | |
| 2017/0152060 A1 | 6/2017 | Morisawa | |

FOREIGN PATENT DOCUMENTS

| | | | |
|---|---|---|---|
| KR | 10-2012-0136797 A | 12/2012 | |
| KR | 10-1559898 B1 | 10/2015 | |
| WO | 2006/112578 A1 | 10/2006 | |
| WO | 2015/178091 A1 | 11/2015 | |
| WO | 2016166366 A1 | 10/2016 | |
| WO | WO-2016166366 A1 * | 10/2016 | A63H 27/12 |

OTHER PUBLICATIONS

European Search Report dated Aug. 22, 2018 in connection with European Patent Application No. 18 16 1233, 14 pages.
Communication from a foreign patent office in a counterpart foreign application, European Patent Office, "Partial European Search Report," Application No. EP 18161233.4, May 9, 2018, 14 pages.

* cited by examiner

UNMANNED AERIAL VEHICLE HAVING DUCT STRUCTURE

CROSS-REFERENCE TO RELATED APPLICATION(S)

This application is related to and claims the benefit of Korean Patent Application No. 10-2017-0030977 filed Mar. 13, 2017, the contents of which are incorporated hereby by reference.

TECHNICAL FIELD

The following exemplary embodiments relate to an unmanned aerial vehicle (UAV), and more particularly, to an UAV having a duct structure.

BACKGROUND

Nowadays, an UAV that can fly and take photographs and video (including image and audio) has been developed and supplied. The UAV may include a drone.

The UAV may manually take-off, land, and fly under the control of a remote controller. Further, the UAV may fly automatically by stand-alone without the control of the remote controller.

A user's safety accident may occur by a propeller of the flying UAV. In order to prevent the safety accident, when a protection guard is added to the UAV, a flying performance of the UAV may be deteriorated because of weight increase.

An UAV according to embodiments of the present disclosure may include a duct structure as a protection device for preventing a user's safety accident. The duct structure may be a structure for enhancing a flying performance and for user safety.

SUMMARY

The present disclosure has been made in view of the above problem and provides an UAV having a duct structure for enhancing a flying performance while preventing a safety accident.

In accordance with an aspect of the present disclosure, an UAV includes a housing including an upper surface, lower surface, and side surface, wherein when a height of the housing is defined to a shortest length from a portion of the upper surface to a corresponding portion of the lower surface, the height of the housing reduces from the center of the housing toward an edge of the housing, and a first slope of the upper surface from the center of the housing to the edge of the housing is smaller than a second slope of the lower surface from the center of the housing to the edge of the housing; a plurality of through-holes formed from the upper surface to the lower surface and symmetrically disposed when viewed from the top of the upper surface, wherein the each through-hole includes an inlet, throat portion, and diffuser, wherein the throat portion is adjacent to the upper surface rather than the lower surface, the inlet has a reducing diameter from the upper surface toward the throat portion, and the diffuser has an increasing diameter from the throat portion toward the lower portion; a plurality of propellers each positioned at the throat portion or at a periphery of the throat portion within one of the through-holes and configured to rotate about a shaft vertical to a surface defined by the throat portion; a plurality of motors each positioned within the diffuser within any one of the through-holes and configured to operate the propellers, respectively; and a control circuit positioned within the housing and configured to control the motors.

In accordance with another aspect of the present disclosure, an UAV includes a frame configured to fix a motor; and a housing configured to enclose the frame, wherein the housing includes a top mesh corresponding to an upper surface thereof, a bottom mesh that covers a portion of a bottom surface thereof, and an middle part coupled to the top cover and the bottom cover, the housing has a plurality of duct areas that penetrate each of the top mesh, the bottom mesh, and the middle part, and the motor and a propeller connected to the motor and for rotating are positioned within the duct area.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
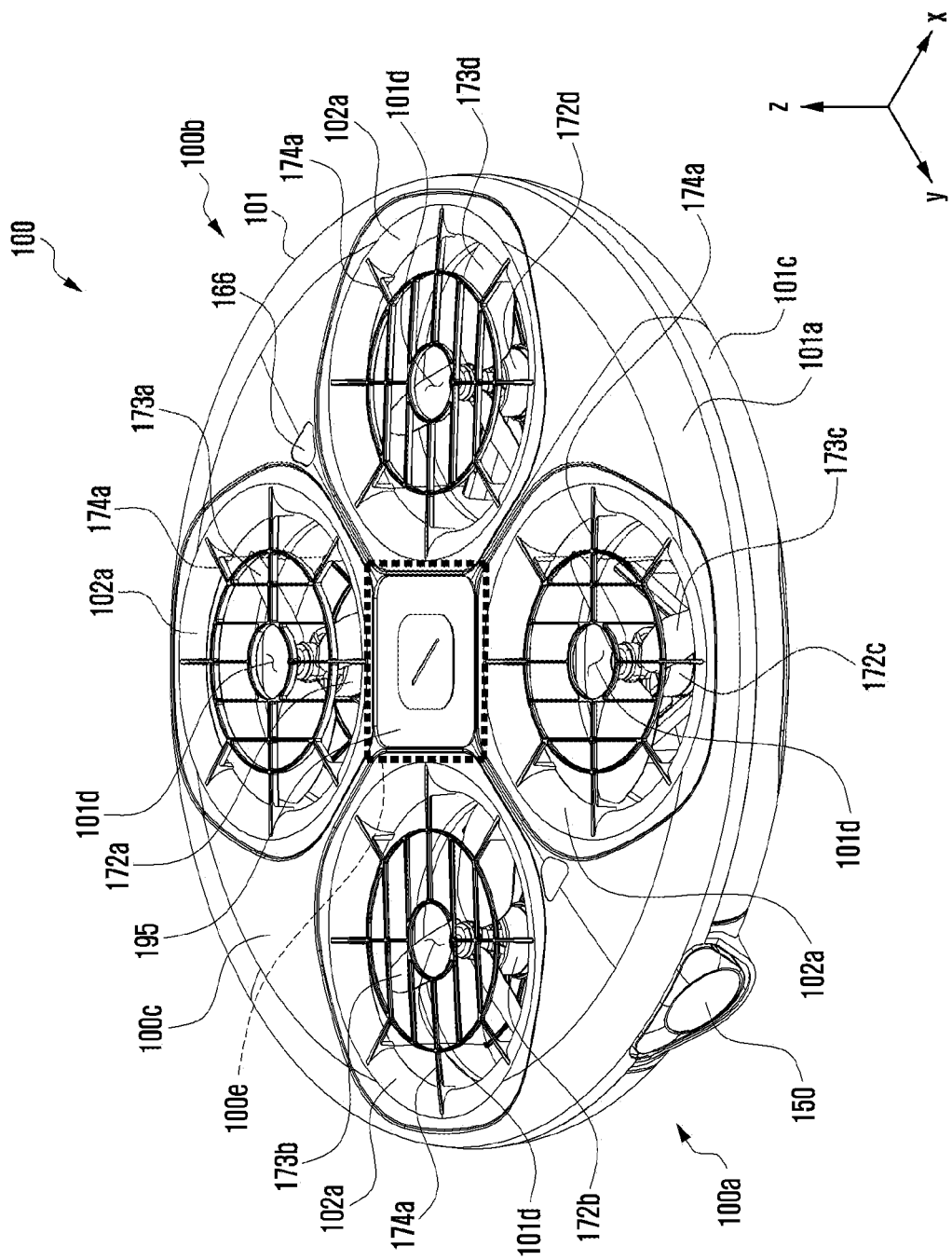
FIGS. 1A and 1B illustrate an UAV according to an embodiment of the present disclosure.

FIGS. 1A through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an embodiment of the present disclosure will be described in detail with reference to the accompanying drawings. Further, a method of producing and using an UAV according to the present disclosure will be described in detail with reference to the accompanying drawings. The same reference numeral suggested in each drawing represents a component or a constituent element that performs substantially the same function.

Terms such as a "first" and a "second" are used for describing various constituent elements, and the constituent elements are not limited by the terms. The terms may be used for distinguishing one constituent element from another constituent element. For example, a first constituent element may be referred to as a second constituent element within the scope of the present disclosure. Further, a second constituent element may be referred to as a first constituent element. A term "and/or" includes a combination of a plurality of described elements or any element of a plurality of described elements.

Terms used in the present application are used for describing an exemplary embodiment and do not limit the present disclosure. Unless the context otherwise clearly indicates, words used in the singular include the plural, the plural includes the singular. Further, in the present application, a term "comprise" or "have" indicates presence of a characteristic, numeral, step, operation, element, component, or combination thereof described in a specification and does not exclude presence or addition of at least another characteristic, numeral, step, operation, element, component, or combination thereof. The same reference numeral suggested in each drawing represents a member that performs substantially the same function.

Figure 1B:
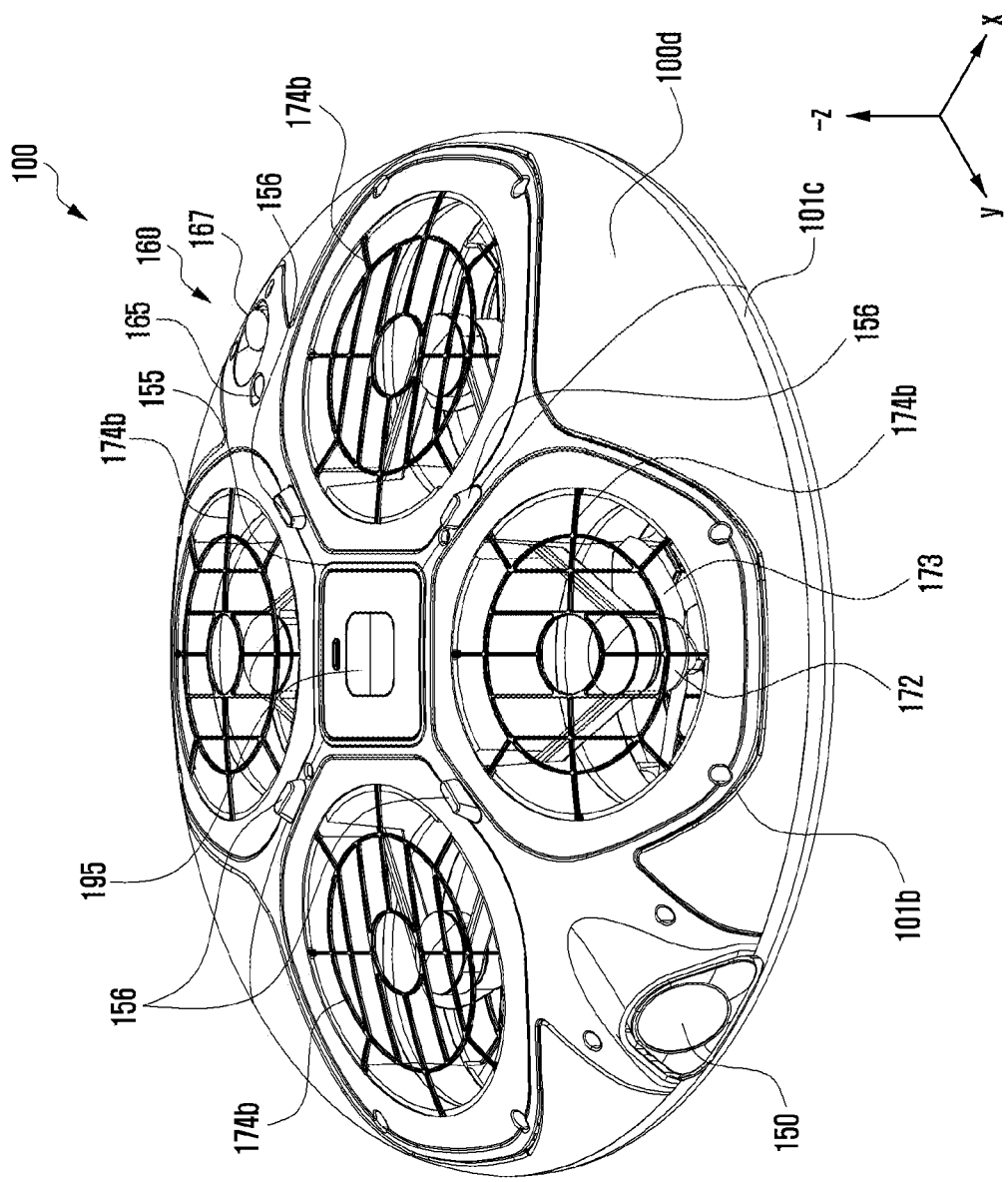

FIGS. 1A and 1B illustrate an UAV according to an exemplary embodiment of the present disclosure.

With reference to FIGS. 1A and 1B, at a front surface 100a of an UAV 100, a camera 150 may be positioned in consideration of an angle of view. For example, the camera 150 may be positioned at a bottom surface 100d (see FIG. 1B) of the UAV 100 or at the low end of the front surface 100a of the UAV 100. Alternatively, the UAV 100 may further include a gimbal (not shown) that maintains a preset angle (or a preset direction) of the camera 150 separately from a movement (e.g., flying) thereof using a sensor (not shown).

The UAV 100 may include a housing 101 that encloses a frame 105 (see FIG. 2), one or a plurality of motors 172, and a propeller 173 corresponding to the number of the motor 172. At a central area 100e of the UAV 100, a printed circuit board (PCB) (or main board) 119 (see FIG. 7) may be positioned. Further, a battery (or a battery pack) 195 may be positioned to face the PCB 119 positioned at the central area 100e of the UAV 100. The PCB 119 or a PCB including a mounted processor 111 (see FIG. 7) may be referred to as a control circuit.

The housing 101 may enclose and protect the motor 172 and the propeller 173 of the UAV 100.

The housing 101 may house the frame 105, one or a plurality of motors 172 coupled to the frame 105, and the propellers 173 corresponding to the number of the motors 172 and have openings 101a corresponding to the number of propellers 173. Further, the UAV 100 may include the frame 105, motor 172, and propeller 173 without the housing 101.

The housing 101 may include a top mesh 101a, bottom mesh 101b, and middle part 101c that may be coupled to each of the top mesh 101a and the bottom mesh 101b. An upper surface of the top mesh 101a may be implemented into a portion or the entire of an upper surface of the housing 101. A lower surface of the bottom mesh 101b may be implemented into a portion or the entire of a lower surface of the housing 101. A side surface of the middle part 101c may be implemented into a portion or the entire of a side surface of the housing 101.

A material of each portion of the housing 101 may be different. A material of the top mesh 101a and a material of the bottom mesh 101b may include wood, light metal, polycarbonate (PC), polypropylene (PP), acrylonitrile butadiene styrene (ABS) resin, or polyamide (PA). A material of the middle part 101c may include expanded polypropylene (EPP), expandable polystyrene (EPS), or latex used for a foam processing. A material of the housing 101 is an example and the present disclosure is not limited thereto.

The UAV 100 may have one or a plurality of (e.g., 2, 3, 4, 6, 8, or more) propellers 173. The UAV 100 may have the motors 172 corresponding to the number of the propellers 173.

At a top 100c of the UAV 100, a proximity sensor 166 for preventing a collision may be positioned.

In an exemplary embodiment of the present disclosure, the UAV 100 having four propellers and motors is described as an example, but the present disclosure is not limited thereto.

The UAV 100 may further include a guard 174 that protects the propeller 173 within the opening 101a. The guard 174 may include a top guard 174a positioned at an upper portion of the propeller 173 and a bottom guard 174b positioned at a lower portion of the propeller 173 within the opening 101a. Alternatively, the guard 174 may include only the top guard 174a positioned at an upper portion of the propeller 173 within the opening 101a. The top guard 174a may be included in the top mesh 101a. The top guard 174a may be included in an upper surface of the housing 101. The bottom guard 174b may be included in the bottom mesh 101b. The bottom guard 174b may be included in a lower surface of the housing 101.

FIG. 1B illustrates the bottom surface 100d of the UAV 100. At the bottom surface 100d of the UAV 100, an optical flow sensor 160 used for maintaining hovering at a current position may be positioned. The optical flow sensor 160 may include an ultrasonic sensor 167. The ultrasonic sensor 167 to which a camera 165 is added may be referred to as an optical flow sensor 160.

At the bottom surface 100d of the UAV 100, a light emitting diode (LED) 151 that can flicker (or turn on/off) to correspond to a state (e.g., flying, rotation, and error) of the UAV 100 may be positioned. The LED 151 may be positioned adjacent (e.g., at an outer edge of a mounting position of the battery 195) to the central area 100e.

At the bottom surface 100d of the UAV 100, a landing gear 156 may be positioned. When the UAV 100 normally lands the ground, a portion that first contacts the ground in the UAV 100 may be referred to as a landing gear 156. The landing gear 156 may be formed integrally with the bottom mesh 101b or may be coupled to a separate structure. In another exemplary embodiment of the present disclosure, a camera may be mounted at the bottom surface 100d of the UAV 100. The camera may be mounted at the bottom surface 100d of the UAV 100 together with the gimbal.

Figure 2:
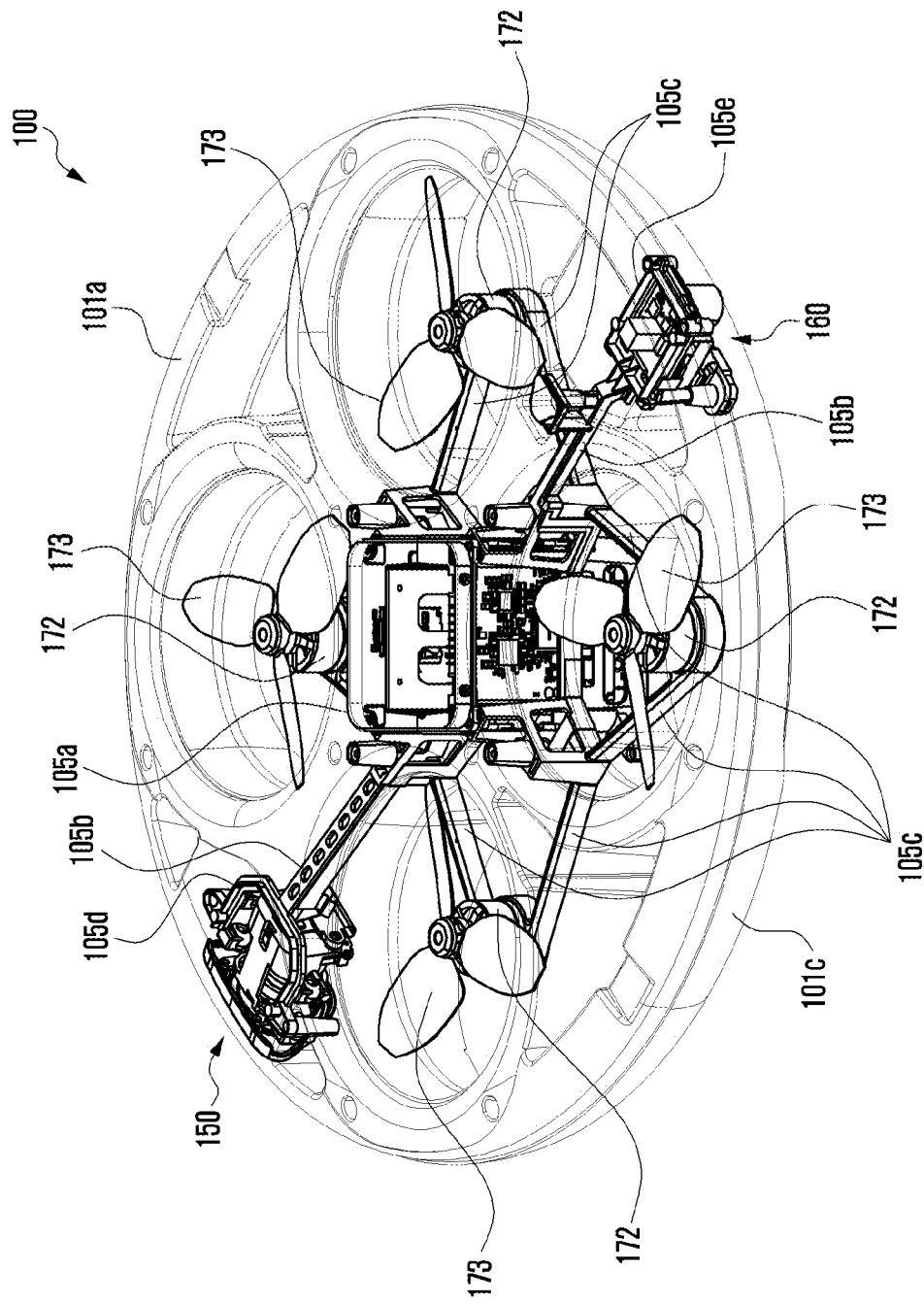
FIG. 2 illustrates constituent elements of an UAV according to an embodiment of the present disclosure.
Figure 3:
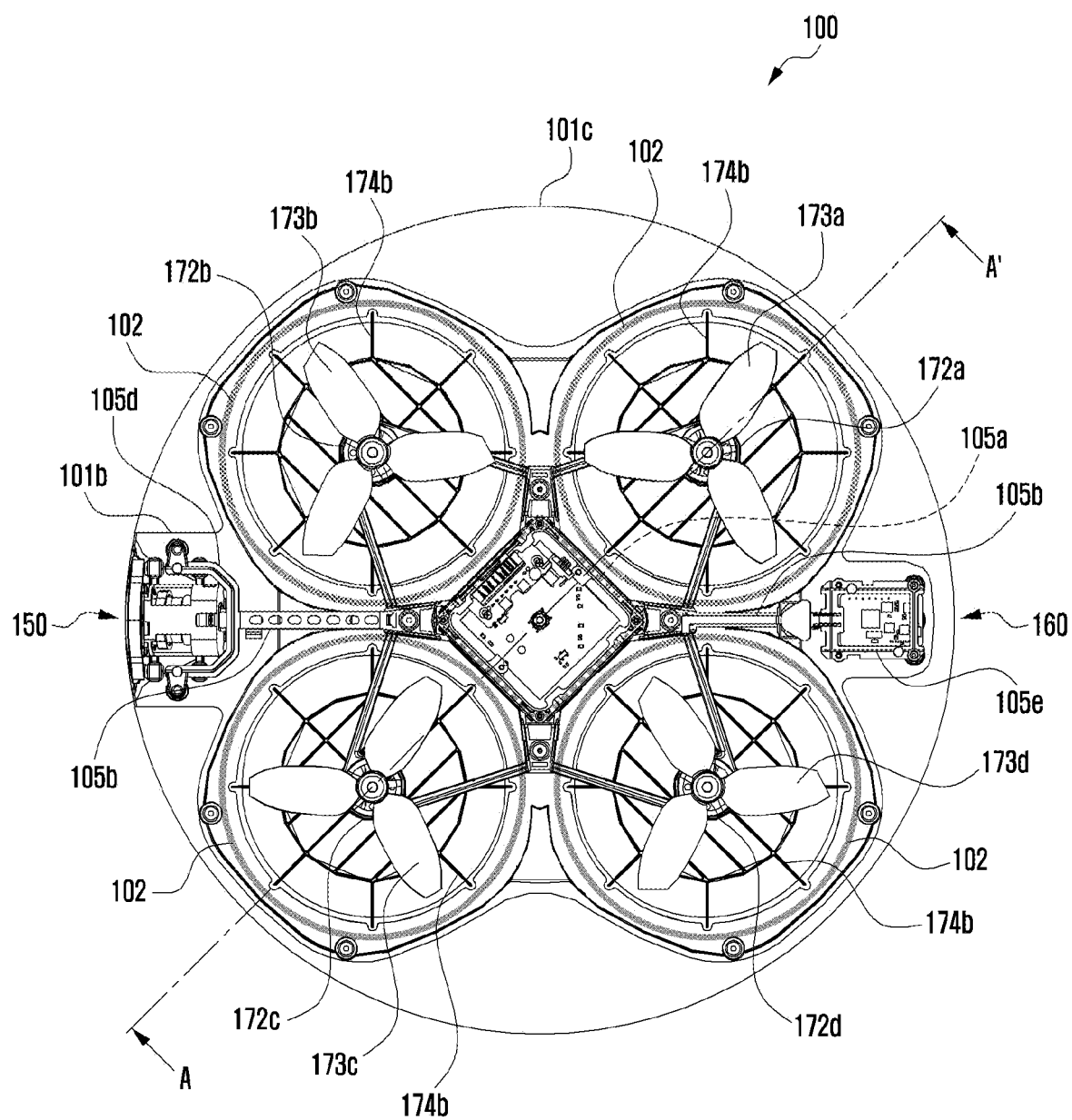
FIG. 3 illustrates a top plan view of an UAV according to an embodiment of the present disclosure.
Figure 4A:
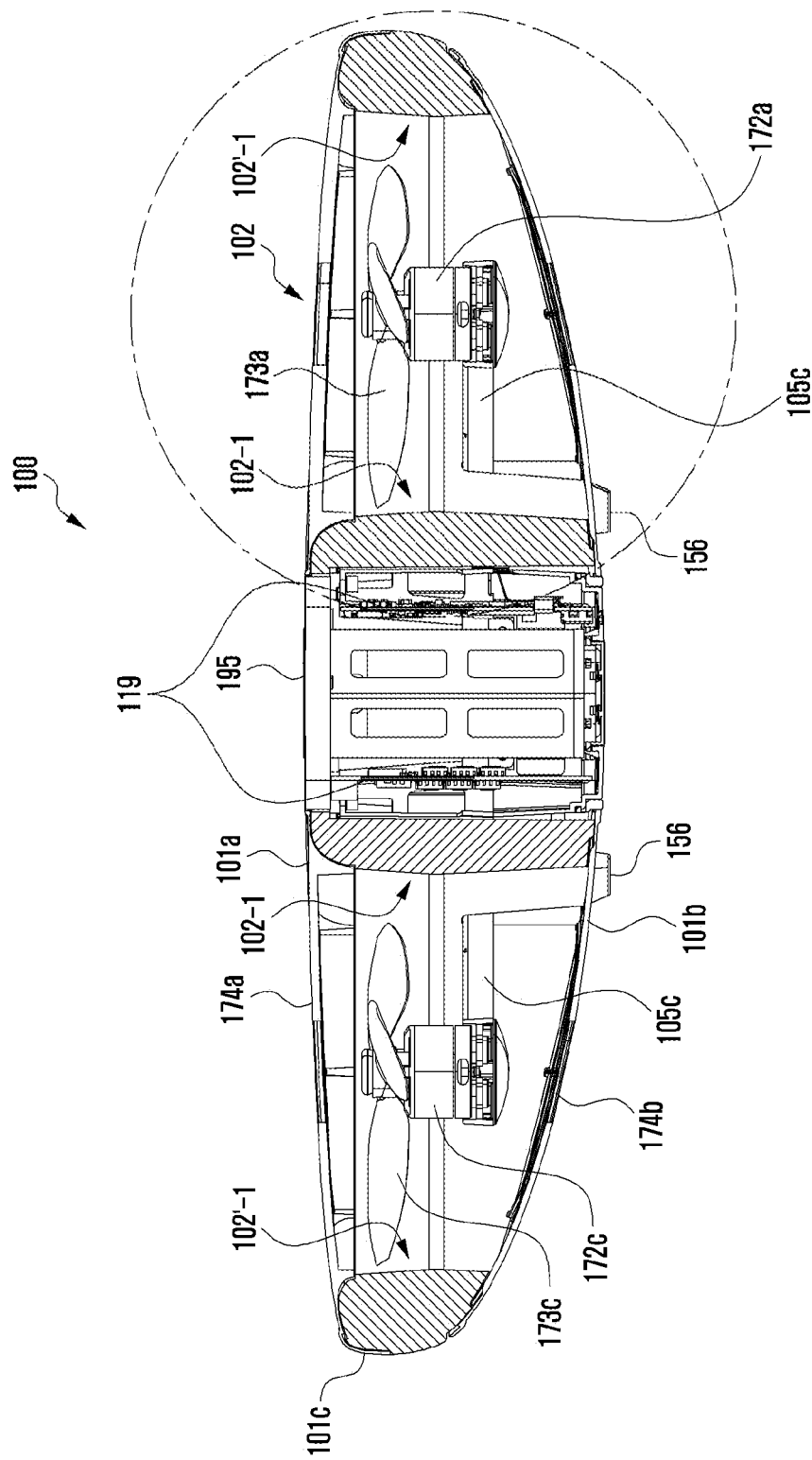
FIGS. 4A to 4E illustrates a duct area of an UAV according to an embodiment of the present disclosure.
Figure 4B:
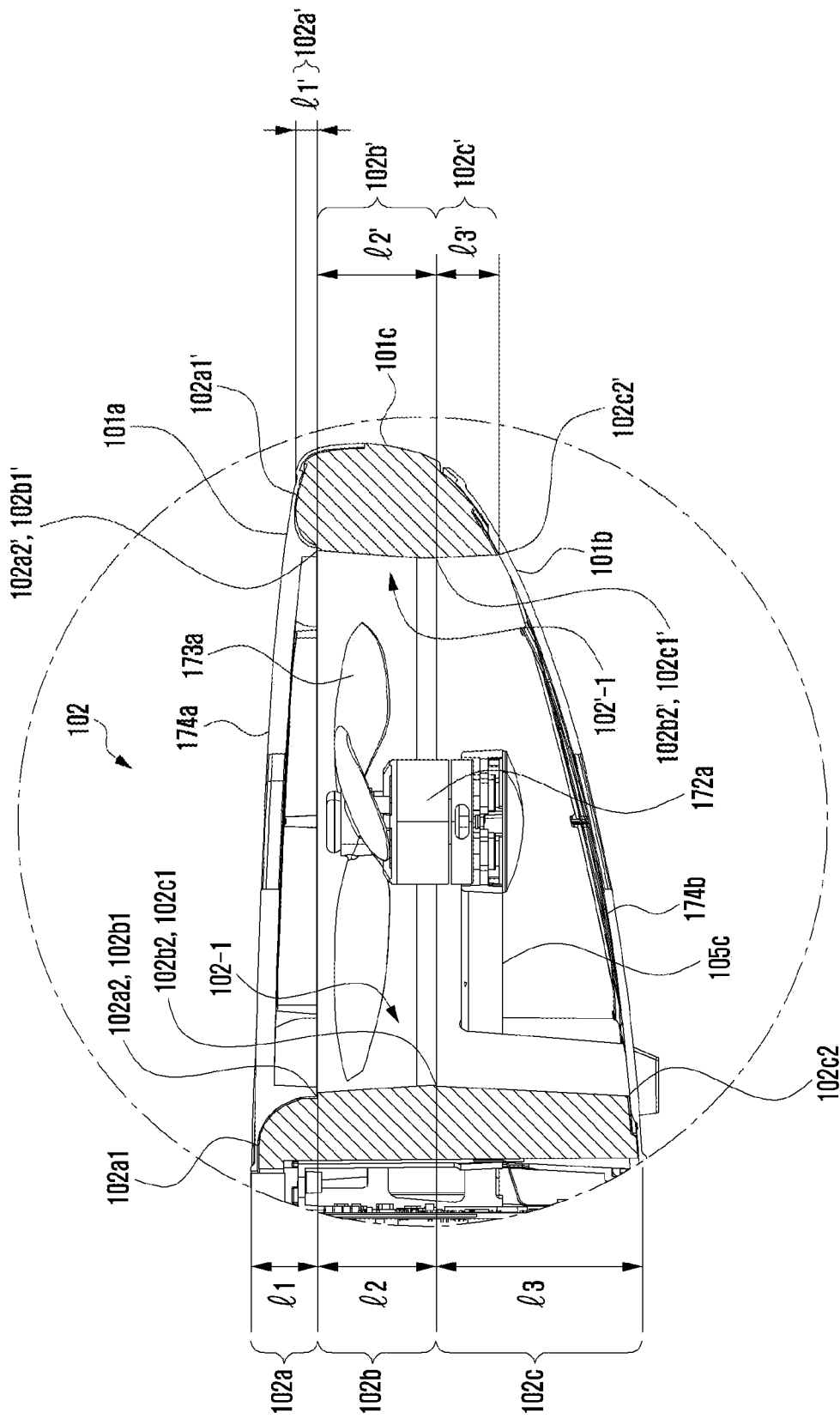
Figure 4C:
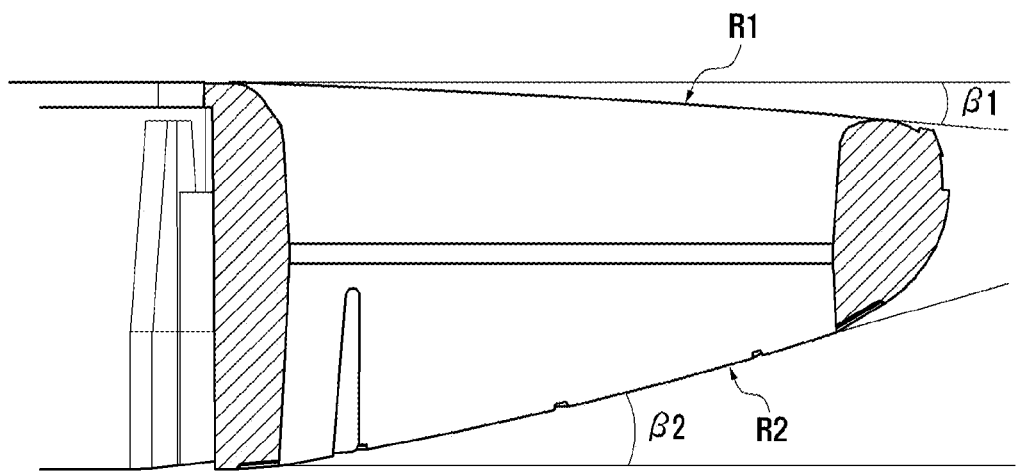
Figure 4D:
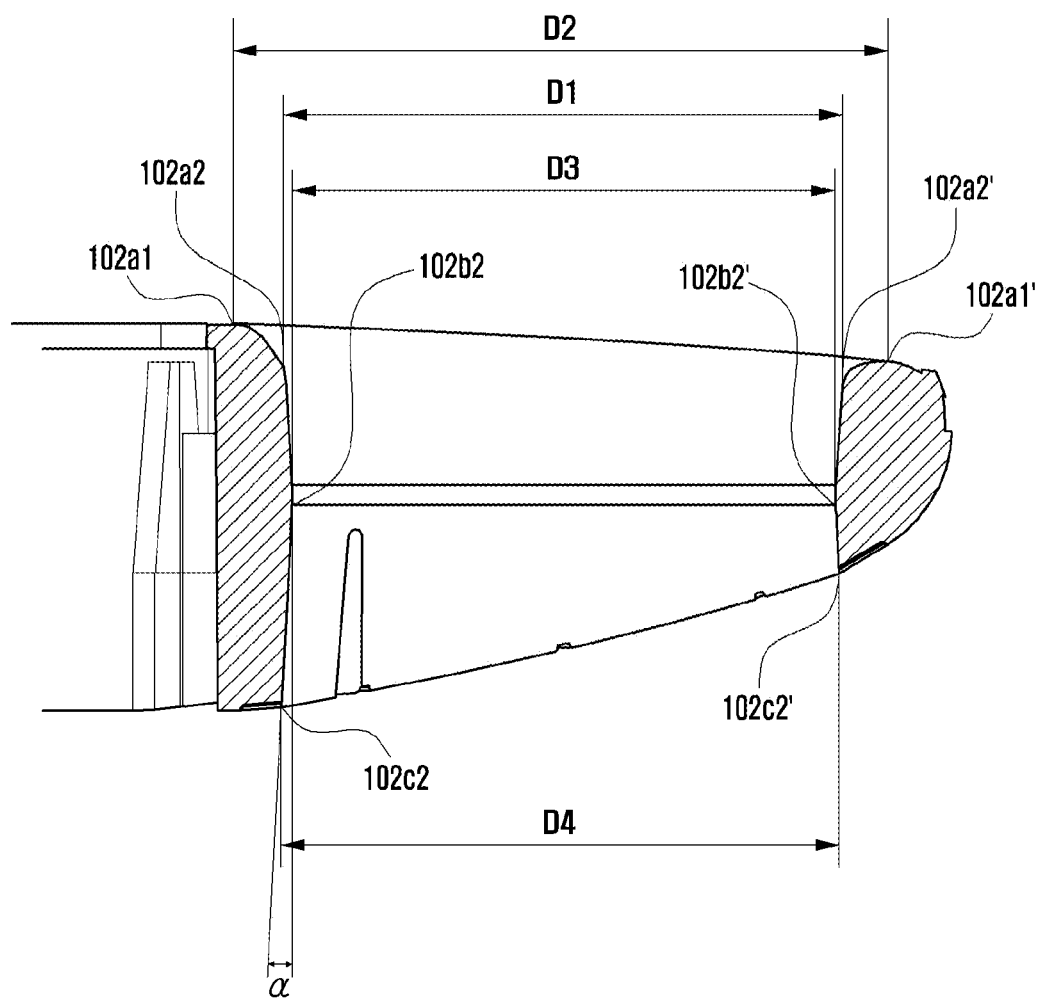
Figure 4E:
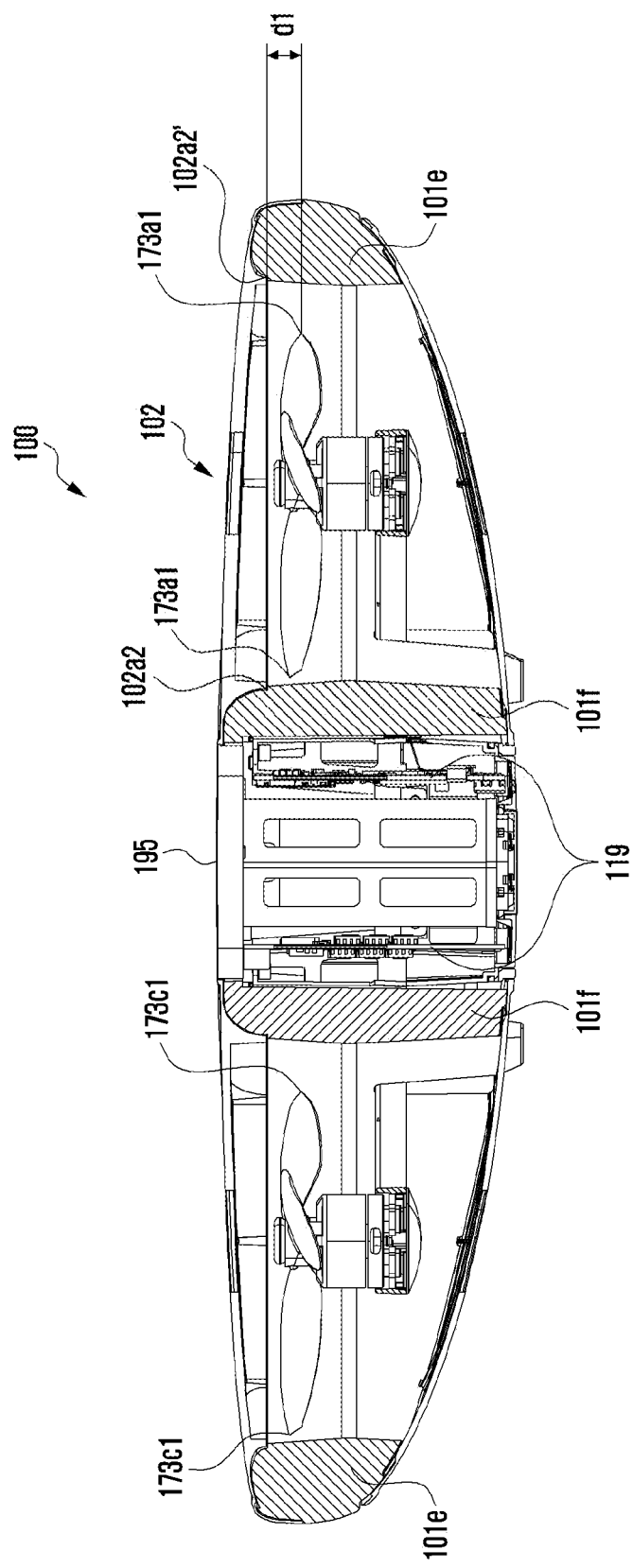

FIG. 2 illustrates constituent elements of an UAV according to an exemplary embodiment of the present disclosure. FIG. 3 illustrates a top plan view of an UAV according to an exemplary embodiment of the present disclosure.

FIGS. 2 and 3 illustrate the housing 101 or 101a, 101b, and 101c and the frame 105 or 105a to 105e of the UAV 100.

The UAV 100 may include a duct area 102 and a frame 105. In the UAV 100, the duct area 102 may be an area that generates lift of the UAV 100. Alternatively, in the UAV 100, the duct area 102 may be an area that generates thrust of the UAV 100.

The duct area 102 may penetrate the housing 101. The duct area 102 may penetrate each of the housings 101a to 101c. The duct area 102 may be referred to as a through-hole.

The duct area 102 may not be overlapped with the frame 105. Alternatively, the duct area 102 may not be overlapped with the remaining frames 105, except for an arm (or 2-arm) 105c. The duct area 102 may be symmetrically positioned based on a frame bar 105b. The duct area 102 may be symmetrically positioned based on a frame arm 105c.

The duct area 102 will be described in detailed later.

In the UAV 100, the PCB 119, the camera 150, the sensor 160, the motor 172, the propeller 173, and the battery 195 may be positioned at the frame 105. The constituent element 119 to 195 may be coupled (or fixed) to the frame 105 of the UAV 100.

The frame 105 may include a central area (or a bracket) 105a in which the PCB 119 and the battery 195 are positioned, a plurality of bars 105b extended in a both side direction (e.g., +/−y shaft direction) from the central area 105a and coupled to the camera 150 and the optical flow sensor 160, and a plurality of arms (e.g., 2-arm form) 105c that fix the motor 172. A 2-arm 105c structure may offset vibrations occurring in the adjacent motors 172 to prevent the frame 105 from twisting.

At both sides (e.g., the left side, the right side) of the plurality of bars 105b, a plurality of motors 172 each may be positioned. A rotation direction of a plurality of motors 172 positioned at one side (e.g., the left side) of the plurality of bars 105b may be different (e.g., one is yaw right and another one is yaw left)

The PCB 119 may be positioned in at least two surfaces of the bracket 105a. The PCB 119 may be positioned at only one surface of the bracket 105a. In an exemplary embodiment, the bracket 105a may be a hexahedron (e.g., having no two surfaces (+/−z shaft direction) of the hexahedron). The PCB 119 may be disposed at the bracket 105a in consideration of weight balance of the UAV 100.

The camera 150 may be coupled to one end of one bar 105b extended from the central area 105a. The camera 150 may photograph a still picture or a moving picture by the control of the processor 111 (see FIG. 7). The camera 150 may include an auxiliary light source (e.g., flash (not shown)) that provides a light quantity necessary for photographing.

In order to obtain clear video data without blurriness in video data, the UAV 100 may include a gimbal (not shown) attached to the camera 150. The gimbal may be, for example, a 3-shaft gimbal. The gimbal may include one or a plurality of motors (not shown) for adjusting an angle of the camera 150. The gimbal may further include a separate sensor (not shown) corresponding to camera driving and/or motor rotation.

The UAV 100 may photograph a user face using the camera 150. The processor 111 (see FIG. 7) may control to recognize the user face to photograph the user face.

The LED 151 may change a color, flicker, or may be turned on or off to correspond to a state (e.g., power on/off, flying, obstacle, internal error, or battery low) of the UAV 100 by the control of the processor 111. At the front surface 100a, a rear surface 100b, and/or the bottom surface 100d of the UAV 100, one or a plurality of LEDs 180 may be positioned.

The sensor 160 may be coupled to one end of another bar 105b extended from the central area 105a.

The sensor 160 may detect a flight state and/or a peripheral environment of the UAV 100. The sensor 160 may detect a physical quantity corresponding to the UAV 100 and/or a peripheral environment. The sensor 160 may convert a detected physical quantity to an electric signal and output the electric signal to the sensor processor 111 of the PCB 119.

The sensor 160 may include an acceleration sensor 161 (see FIG. 9) that measures acceleration of the UAV 100, magnetometer (not shown) that detects a direction of magnetic north of the UAV 100, gyro sensor 163 (see FIG. 9) that detects a rotation angular speed of the UAV 100, barometer (not shown) that detects current altitude of the UAV 100, optical flow sensor 160, proximity sensor 166, and/or ultrasonic sensor 167.

The position information receiver (not shown) may periodically receive a signal (e.g., orbit information of the satellite, time information and navigation message of the satellite) from a plurality of satellites (not shown) in an earth orbit. The position information receiver may be positioned at the top 100c of the UAV 100. The position information receiver may be positioned at the central area 100e of the top 100c of the UAV 100.

The UAV 100 may calculate a position of each satellite (not shown) and the UAV 100 using signals received from a plurality of satellites and calculate a distance using a transmitting/receiving time difference. The UAV 100 may calculate each of a current position, current time, altitude, and moving speed of the UAV 100 through triangulation. The UAV 100 may calculate each of a current position, current time, altitude, and moving speed thereof using the position information receiver.

The UAV 100 may correct (e.g., hovering or auto return mode that returns to a take-off position) a position using a calculated position or moving speed.

The UAV 100 may maintain (e.g., hover) a current position (or a preset position received from the remote controller (not shown)) using the position information receiver and the optical flow sensor 160 (having a camera and an ultrasonic sensor). For example, the UAV 100 may limit a movement (or rotation) by an external influence (wind, snow, or rain) or an error of an internal control (motor control) while flying using the optical flow sensor 160 to maintain a current position and altitude.

The processor 111 may calculate a flight state of the UAV 100 using the sensor 160. A flight state of the UAV 100 may include a rotational state and a translational state. The rotational state may mean yaw, pitch, and roll. The rotational state may be detected by the acceleration sensor 161, the magnetometer 162, and/or the gyro sensor 163.

The translational state may mean longitude, latitude, altitude, and speed. The translational state may be detected by the position information receiver and the barometer.

The UAV 100 may fly using the calculated flight state. The processor 111 may output a pulse width modulation (PWM) signal for driving the driver to correspond to the calculated flight state.

The driver may include an electronic speed controller (not shown and hereinafter, referred to as "ESC"), motor 172, and propeller 173. The driver may take-off, land, or fly the UAV 100 to correspond to a PWM signal received from the processor 111.

The ESC may control (e.g., change) a rotation speed of the motor 172. The ESC may control (e.g., accelerate, decelerate, stop, rotate, or reverse rotate) the motor 172 according to the received PWM signal. The ESC may control one motor 172 or a plurality of (e.g., 2, 3, 4, or more) motors.

The ESC may be mounted in the PCB 119 of the UAV 100 or may be positioned between the main board 119 and the motor 172.

The ESC may convert DC power of the battery 195 to AC power and supply AC power to the motor 172. Alternatively, the processor 111 may convert DC power of the battery 195 to AC power using a power supply unit (not shown) and supply AC power to the motor 172.

The motor 172 may be driven (e.g., rotated, stopped, accelerated, or decelerated) by the ESC. The motor 172 may be positioned at a coupling area of the 2-arm 105c extended from a bracket (or the central area) 105a of the UAV 100. The motor 172 may include a brushless DC motor (BLDC motor).

When the UAV 100 is a quadrotor, the UAV 100 may have four motors 172. Two motors (e.g., 172a, 172c) of the four motors 172a to 172d may rotate clockwise. The remaining two motors (e.g., 172b, 172d) may rotate counterclockwise. A rotation direction of the motor 172 may be changed to correspond to the number of the motors 172 applied to the UAV 100.

The propeller 173 coupled to a shaft of the motor 172 may rotate according to a rotation direction of a shaft of the motor 172. The UAV 100 may fly by the rotating propeller 173. The UAV 100 may hover, yaw right, yaw left, pitch down, pitch up, roll left, roll right, move upward, and move downward according to a rotation of the motor 172 and the propeller 173. Alternatively, the UAV 100 may hover, yaw right, yaw left, pitch down, pitch up, roll left, roll right, move upward, and move downward by the motor 172 and the propeller 173 rotating to correspond to flight control information of a remote controller 10.

A speaker (not shown) may output a sound corresponding to a state (e.g., power on/off, flying, obstacle, internal error, or battery low) of the UAV 100 by the control of the processor 111. At the front surface 100a, the rear surface 100b, and/or the bottom surface 100d of the UAV 100, one or a plurality of speakers may be positioned.

The processor 111 (see FIG. 7) mounted in the PCBs 119a to 119c may further include a read-only memory (ROM) 112 that stores a control program for the control of the UAV 100 and a random-access memory (RAM) 113 used as a storage area of flying control information, flying information, photographing data received from the outside of the UAV 100, or various works (e.g., delivery, racing, or agricultural pesticide spray) corresponding to flying of the UAV 100.

The processor 111 may control an operation (e.g., take-off, landing, flying, hovering) of the UAV 100 and signal flow between the internal constituent elements 110 to 190 of the UAV 100 and perform a function of processing data. The processor 111 may control power supply from the battery 195 to the internal constituent elements 120 to 185.

The processor 111 may further include a sensor processor 115 (see FIG. 7) that determines (or calculates) a flying state or a peripheral environment of the UAV 100 using analog data (or digital data) received from one or a plurality of sensors of the UAV 100.

The processor 111 may further include a communication processor 120 (see FIG. 7 and hereinafter, may be referred to as a 'communication unit') that controls communication between the UAV 100 and the outside.

The processor 111 may control the communication unit 120, the camera 150, the position information receiver (not shown), the sensor 160, a driver, a speaker (not shown), and a storage unit (not shown).

In an exemplary embodiment of the present disclosure, a "controller of the UAV 100" may include a processor 111, ROM 112, and RAM 113. The "controller of the UAV 100" may include the processor 111, the sensor processor 115, the ROM 112, and the RAM 113. Alternatively, "the controller of the UAV 100" may mean a processor (or a flight processor 111).

The communication unit 120 (see FIG. 7) mounted in the PCBs 119a to 119c may be connected to the outside through a communication network using at least one antenna by the control of the processor 111. The communication unit 120 may transmit flying information and photographing data of the UAV 100 to the outside by the control of the processor 111. Alternatively, the communication unit may receive flying control information from the outside (remote controller or server) by the control of the processor 111.

The communication unit 120 may include a wireless local area network (LAN) communication unit (not shown), short range communication unit (not shown), or mobile communication unit (not shown).

The communication unit 120 may be implemented into one or a plurality of communication chips.

A storage unit (not shown) may store a signal or data input/output to correspond to an operation of the constituent elements 110 to 195 by the control of the processor 111. The storage unit may store a control program for the control of the processor 111 or the UAV 100.

The storage unit may store flight control information (e.g., flying, stop, rotation, hovering) received from the outside (or the remote controller or the server), an electric signal received from the sensor 160, flight information (e.g., position, speed, battery residual quantity) of the UAV 100, control information of the camera 150, or video data (including image or audio) photographed by the camera 150.

In an exemplary embodiment of the present disclosure, a term "storage unit" may include a storage unit, ROM, RAM, or memory card (e.g., micro SD card (not shown)) mounted in the UAV 100. The storage unit may include a nonvolatile memory, volatile memory, or solid state drive (SSD).

A power supply unit 190 (see FIG. 7) of the PCB 119c (see FIG. 7), which is one of the PCBs 119 may supply power of the battery 195 to the constituent elements 110 to 190 of the UAV 100 by the control of the processor 111. The power supply unit 190 may charge at least one battery 195 by the control of the processor 111. Alternatively, the processor 111 may convert DC power of the battery 195 to AC power using the power supply unit 190 to supply AC power to each motor 172.

It may be easily understood by a person of ordinary skill in the art that at least one constituent element of the UAV 100 of FIGS. 1A to 3 may be added (e.g., add a gimbal), removed (e.g., a speaker), or changed to correspond to a performance of the UAV 100.

FIGS. 4A to 4E illustrates a duct area of an UAV according to an exemplary embodiment of the present disclosure.

FIGS. 4A to 4E illustrate a cross-section of the duct area 102. The duct area 102 may include a first cross-section 102-1 positioned in a direction of the central area 105a, which is a mounting position of the battery 195 of the UAV 100 and a second cross-section 102'-1 disposed opposite to the first cross-section 102-1 based on the motor 172.

The first cross-section (or referred to as a 'first internal wall') 102-1 of the duct area 102 that injects (or sucks) air by a rotation of the propeller 173 may be divided into three areas. The first cross-section 102-1 of the duct area 102 may be divided into, for example, an inlet 102a of a round shape continued (or formed in the top mesh 101a) from the top mesh 101a, a throat (or throat portion) 102b of a straight line shape continued in a bottom direction of the UAV 100 from the inlet 102a to be formed at a central portion 101c, and a diffuser 102c' of a straight line shape continued in a direction of the bottom mesh 101b of the UAV 100 from the throat 102b.

A second cross-section (or referred to as a 'second internal wall') 102'-1 of the duct area 102 may be divided into three areas. The second cross-section 102'-1 of the duct area 102 may be divided into, for example, an inlet 102a' of a round shape continued (or formed in the top mesh 101a) from the top mesh 101a, a throat 102b' of a straight line shape continued in a bottom direction of the UAV 100 from the inlet 102a' to be formed in the central portion 101c, and a diffuser 102c' of a straight line shape continued in a bottom direction of the UAV 100 from the throat 102b'.

The inlet 102a is an entrance (or suction) area of air and may be a round area. The inlet 102a may have a bell mouth shape. At an entrance of the inlet 102a of a bell mouth shape, an influence of turbulence may be reduced. Much air may be entered into an entrance of the inlet 102a of a bell mouth shape because of reduction of an influence by turbulence.

In the inlet 102a, a flow speed increases and a pressure reduces by Bernoulli's principle. A diameter of the inlet 102a may be changed (e.g., a diameter may be reduced) according to a curvature of a round surface. The inlet 102a may include a start point 102a1 and an end point 102a2 of the round surface. The inlet 102a may be formed (processed or shaped) in the top mesh 101a.

The throat 102b may be a straight line area started from the end point 102a2 of the inlet 102a. Alternatively, the throat 102b may be continued from the end point 102a2 of the inlet 102a. A diameter of the throat 102b may be reduced (or may be continuously reduced) from the end point 102a2 of the inlet 102a. Alternatively, the throat 102b may have a gradient from the end point 102a2 of the inlet 102a by a mold processing.

The diffuser 102c may be a straight line area started from an end point 102b2 of the throat 102b. In the diffuser 102c, a flow speed may reduce and a pressure may increase, compared with the inlet 102a. The diffuser 102c may be continued from the end point 102b2 of the throat 102b. A diameter of the diffuser 102c may increase (or may continuously increase) from the end point 102b2 of the throat 102b.

In the duct area 102, when a height difference between the start point 102a1 of the inlet 102a of the first cross-section 102-1 and the start point 102a1' of the inlet 102a' of the second cross-section 102'-1 is small (e.g., flat), a flying performance can be improved. For example, much air may be entered (or sucked) into the inlet 102a of a bell mouth shape. Further, because much air is entered, a consumption amount of the battery 195 may be reduced.

A curvature R1 of the top mesh 101a may be different from a curvature R2 of the bottom mesh 101b. The curvature R2 of the bottom mesh 101b may be larger than the curvature R1 of the top mesh 101a. The curvature R1 may mean a bent level of the top mesh 101a. The curvature R2 may mean a bent level of the bottom mesh 101b. A large curvature R2 may mean a bent level larger than that of the curvature R1. In the UAV 100 according to the present exemplary embodiment, a curvature R2 of the bottom mesh 101b may be larger than a curvature R1 of the top mesh 101a. In an exemplary embodiment of the present disclosure, a flying performance (e.g., an air suction amount increases and it is advantageous in lift occurrence) of the UAV 100 in which the curvature R2 of the bottom mesh 101b is larger than the curvature R1 of the top mesh 101a can be enhanced.

When an angle β1 between an imaginary line extended in a second cross-section direction from the inlet start point 102a1 of the first cross-section 102-1 and an imaginary line that connects the inlet start point 102a1' of the second cross-section 102'-1 from the inlet start point 102a1 of the first cross-section 102-1 is small, a flying performance (e.g., additional lift occurrence) can be improved. When the angle β1 approaches 0°, a flying performance can be enhanced. The angle β1 may be, for example, 0° to 5°. A height difference by the angle β1 may be 0% to 25% based on a height of the UAV 100.

An angle β2 between an imaginary line extended in a second cross-section direction from the diffuser end position 102c1 of the first cross-section 102-1 and an imaginary line that connects the diffuser end position 102c1' of the second cross-section 102'-1 from the diffuser end position 102c1 of the first cross-section 102-1 may be different from the angle β1. It is preferable that the angle β2 is larger than the angle β1. The angle β2 may be, for example, 5° to 15°. A height difference by the angle β2 may be 25% to 85% based on a height of the UAV 100.

When comparing a weight of the housing 101 having a different angle (β1≠β2) with a weight of a housing having the same angle (β1=β2), a weight of the housing 101 having a different angle (β1≠β2) may be lighter. A weight of the housing 101 having a different angle (β1≠β2) may be reduced by 8% to 15%, compared with a weight of a housing having the same angle (β1=β2).

In the housing 101 having a different angle (β1≠β2), weight reduction of an edge area 101e (e.g., an outer area of the second cross-section 102'-1 in the duct area 102) reduces inertia of the UAV 100 to improve a flying performance (or additional lift occurrence) of the UAV 100.

In the housing 101 having a different angle (β1≠β2), weight reduction of an edge area 101e may be larger than that of an adjacent area 101f of the PCB 119. In the housing 101 having a different angle (β1≠β2), weight reduction of the edge area 101e may reduce inertia of the UAV 100 to improve a flying control (or a posture control) of the UAV 100.

Weight reduction of the housing 101 may have an influence on even an entire weight of the UAV 100. A flying performance (e.g., additional lift occurrence) or a flying control (or a posture control) of the UAV 100 may be improved by weight reduction of the housing 101.

The UAV 100 may take-off (or hover) and quickly move. From a moment of inertia viewpoint, in order to move the UAV 100, a posture change (e.g., inclination) of the UAV 100 is required. For example, in order to move the UAV 100 forward, the UAV 100 may be first inclined to the front side. Alternatively, in order to move the UAV 100 to the left side, the UAV 100 may be first inclined to the left side.

A posture change of an UAV having a large moment of inertia (or having the housing 101 of the same angle (β1=β2)) may require larger thrust (or a more moving time), compared with a posture change of an UAV having a small moment of inertia (or having the housing 101 of a different angle (β1≠β2)).

From a moment of inertia viewpoint, in the housing 101 having a different angle (β1≠β2), weight reduction of the edge area 101e may improve a flying performance (e.g., additional lift occurrence) or a flying control (or a posture control) of the UAV 100.

The UAV 100 may improve lift and mobility through weight reduction (or minimization) of the edge area 101e by the housing 101 having a different angle (β1≠β2). Further, the UAV 100 may prevent a thrust loss to improve a thrust ratio through weight reduction (or minimization) of the edge area 101e by the housing 101 having a different angle (β1≠β2).

In the duct area 102, a diameter of each area 102a to 102c may be different. A rate (or a diameter rate) of a diameter D2 between the start position 102a1 of the inlet 102a of the first cross-section 102-1 and the start position 102a1' of the inlet 102a' of the second cross-section 102'-1 to a diameter D1 between the end position 102a2 of the inlet 102a of the first cross-section 102-1 and the end position 102a2' of the inlet 102a' of the second cross-section 102'-1 may be 1.15 to 1.3. Sufficient air may be entered into the inlet 102a to correspond to a diameter ratio D2/D1 of the inlet 102a.

A diameter D3 between the end position 102b2 of the throat 102b of the first cross-section 102-1 and the end position 102b2' of the throat 102b' of the second cross-section 102'-1 may be smaller than a diameter D1 between the end position 102a2 of the inlet 102a of the first cross-section 102-1 and the end position 102a2' of the inlet 102a' of the second cross-section 102'-1. A diameter D3 between the end position 102b2 of the throat 102b of the first cross-section 102-1 and the end position 102b2' of the throat 102b' of the second cross-section 102'-1 may be smaller than a diameter D2 between the start position 102a1 of the inlet 102a of the first cross-section 102-1 and the start position 102a1' of the inlet 102a' of the second cross-section 102'-1.

A diameter D4 between the end position 102c2 of the diffuser 102c of the first cross-section 102-1 and the end position 102c2' of the diffuser 102c' of the second cross-section 102'-1 may be smaller than or the same as a diameter D1 between the end position 102a2 of the inlet 102a of the first cross-section 102-1 and the end position 102a2' of the inlet 102a' of the second cross-section 102'-1. A diameter D4 between the end position 102c2 of the diffuser 102c of the first cross-section 102-1 and the end position 102c2' of the diffuser 102c' of the second cross-section 102'-1 may be smaller than a diameter D2 between the start position 102a1 of the inlet 102a of the first cross-section 102-1 and the start position 102a1' of the inlet 102a' of the second cross-section 102'-1. A diameter D4 between the end position 102c2 of the diffuser 102c of the first cross-section 102-1 and the end position 102c2' of the diffuser 102c' of the second cross-section 102'-1 may be larger than a diameter D3 between the end position 102b2 of the throat 102b of the first cross-section 102-1 and the end position 102b2' of the throat 102b' of the second cross-section 102'-1.

In the diffuser 102c, additional lift may be secured through a sectional structure. A flow speed of air that passes through the propeller 173 may be decelerated and a pressure thereof may increase to push peripheral air (lift occurrence). A pressure (e.g., additional lift occurrence) increased by an inclined cross-section (e.g., diameter increase) of the diffuser 102c may lift the UAV 100. At the diffuser 102c, because air may not flow a surface of the rapidly inclined diffuser 102c, air may be separated from the surface. When air is separated from the surface of the diffuser 102c, additional lift may not occur.

For additional lift, an angle α between an imaginary line that connects the end position 102c2 of the diffuser 102c of the first cross-section 102-1 from the start position 102c1 of the diffuser 102c of the first cross-section 102-1 and an imaginary line extended from the start position 102c1 of the diffuser 102c of the first cross-section 102-1 may be 3° to 5°.

At the inlet 102a of the first cross-section 102-1, the end position 102a2 may correspond (or correlate) to a position of the propeller (e.g., 173a). A gap d1 may exist between the end position 102a2 at the inlet 102a of the first cross-section 102-1 and the end position 102a2' at the inlet 102a' of the second cross-section 102'-1 and a tip 173a1 of the propeller 173a.

When the propeller 173 rotates, the propeller tip 173a1 may move (or may be changed) upward (e.g., +z shaft direction) by an angular speed. A gap between the propeller tip 173a1 and the throat 102b may increase by change of the propeller tip 173a1. A flying performance of the UAV 100 may be deteriorated by a gap between the changed propeller tip 173a1 and the throat 102b.

The changed propeller tip 173a1 may be positioned lower than the end position 102a2 at the inlet 102a of the first cross-section 102-1. Alternatively, the increased propeller tip 173a1 may be positioned lower than the end position 102a2' at the inlet 102a' of the second cross-section 102'-1. The gap d1 may be 2 mm or more. The gap d1 may be 1.7 mm to 3.5 mm.

At the inlet end position 102a2 of the first cross-section 102-1, a parting line may be formed according to coupling of the top mesh 101a and the middle part 101c. A parting line of the first cross-section 102-1 may be positioned at an upper portion (e.g., +z shaft direction) further than the propeller tip 173a1. At the inlet end position 102a2' of the second cross-section 102'-1, a parting line may be formed according to coupling of the top mesh 101a and the middle part 101c. A parting line of the second cross-section 102'-1 may be positioned at an upper portion (e.g., +z shaft direction) further than the propeller tip 173a1.

At the inlet end position 102a2 of the first cross-section 102-1, the top mesh 101a and the middle part 101c may be coupled with a step (e.g., a method in which the top mesh 101a is protruded in a direction of the propeller 173 rather than the middle part 101c) that enables air flow to smoothly perform instead of a reverse step (drop) (e.g., a method in which the middle part 101c is protruded in a direction of the propeller 173 rather than the top mesh 101a) that disturbs air flow.

At the inlet end position 102a'2 of the second cross-section 102'-1, the top mesh 101a and the middle part 101c may be coupled with a step (e.g., a method in which the top mesh 101a is protruded in a direction of the propeller 173 rather than the middle part 101c) that enables air flow to smoothly perform instead of a reverse step (drop) (e.g., a method in which the middle part 101c is protruded in a direction of the propeller 173 rather than the top mesh 101a) that disturbs air flow.

A height l1 of the inlet 102a of the first cross-section 102-1 may be larger than a height l1' of the inlet 102a' of the second cross-section 102'-1. A height l2 of the throat 102b of the first cross-section 102-1 may be substantially the same (e.g., a difference of +/−1 mm or less) as a height l2' of the throat 102b' of the second cross-section 102'-1. A height l3 of the diffuser 102c of the first cross-section 102-1 may be larger than a height l3' of the diffuser 102c' of the second cross-section 102'-1.

A cross-section (the first cross-section 102-1 and the second cross-section 102'-1) structure of the duct area 102 may be a structure that enhances a flying performance of the UAV 100. Alternatively, a cross-section (the first cross-section 102-1 and the second cross-section 102'-1) structure of the duct area 102 may be a structure that can prevent a user's safety accident (e.g., a user contact with the propeller 173).

The inlet 102a', the throat 102b', and the diffuser 102c' of the second cross-section 102'-1 are substantially similar to the inlet 102a, the throat 102b, and the diffuser 102c of the first cross-section 102-1; therefore, a detailed description thereof will be omitted.

Figure 5:
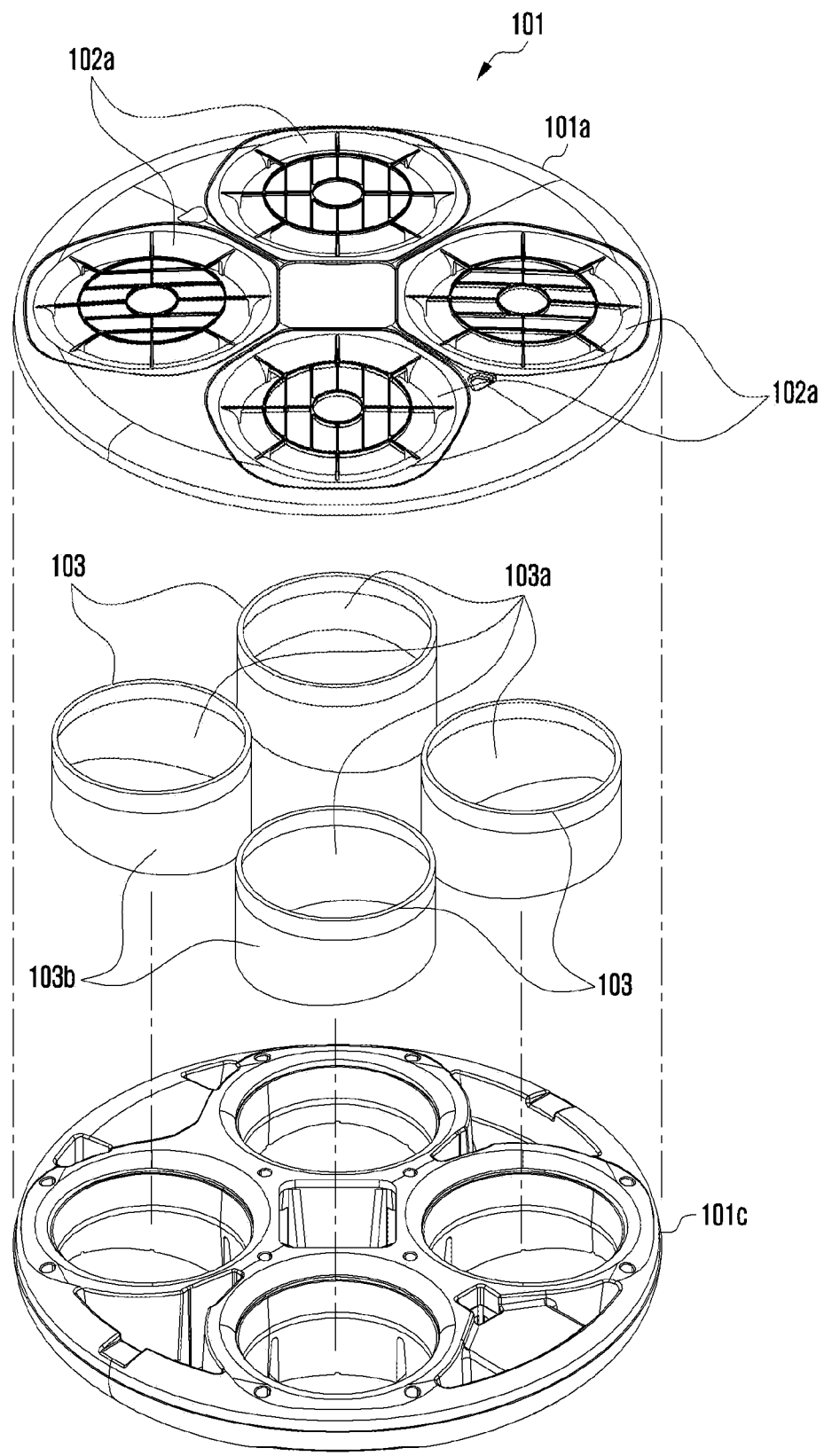
FIG. 5 illustrates an acoustic absorbent of an UAV according to an embodiment of the present disclosure.

FIG. 5 illustrates an acoustic absorbent of an UAV according to an exemplary embodiment of the present disclosure.

With reference to FIG. 5, the housing 101 may include a top mesh 101a, bottom mesh 101b, and middle part 101c. The top mesh 101a, the bottom mesh 101b, and the middle part 101c may be separated from each other. Materials constituting the housing 101a to 101c may be different from each other. The top mesh 101a having a curvature R1 that can reduce an influence of turbulence may be made of a material that can perform a precision processing. The bottom mesh 101b having a curvature larger than the curvature R1 may be made of a material that can perform a precision processing. For example, a material of the top mesh 101a and the bottom mesh 101b may include wood, light metal, polycarbonate (PC), polypropylene (PP), acrylonitrile butadiene styrene (ABS) resin, or polyamide (PA).

Unlike the top mesh 101a and the bottom mesh 101b, the middle part 101c may be made of a light weight material for reducing a battery consumption amount as well as an impact absorption material for protection of the frame 105 and an internal constituent element. For example, a material of the middle part 101c may include expanded polypropylene (EPP), expandable polystyrene (EPS), or latex that has a low specific gravity and that may perform a foam processing. Further, a material of the middle part 101c may include an injection resin in consideration of a minimum thickness that can be produced.

The material of the housing 101 is an example and the present disclosure is not limited thereto.

EPP, which is one of materials of the middle part 101c may be a porous material to have a sound absorption function. In order to reduce noise of a driver of the UAV 100, a separate acoustic absorbent 103 may be added to the housing 101. A material of the acoustic absorbent 103 may include foam urethane (or sponge).

The acoustic absorbent 103 may be added to the duct area 102. When the acoustic absorbent 103 having a thickness is coupled (or attached) to the duct area 102, a diameter of the duct area to which the acoustic absorbent 103 is coupled (or attached) may be different from each diameter D1 to D4 of the duct area 102 before the acoustic absorbent 103 is coupled (or attached). An inner surface 103a of the acoustic absorbent 103 may correspond to the first cross-section 102-1 and the second cross-section 102'-1 of the duct area 102. An outer surface 103b of the acoustic absorbent 103 may correspond to the first cross-section 102-1 and the second cross-section 102'-1 of the duct area 102.

Figure 6A:
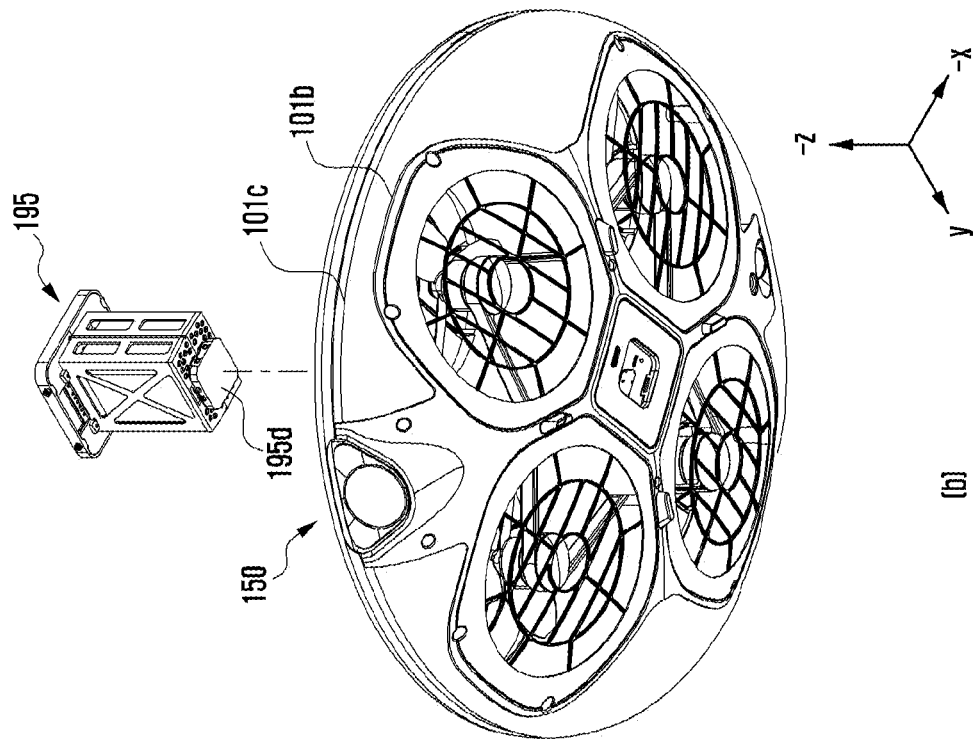
FIGS. 6A and 6B illustrate mounting and separation of a battery pack of an UAV according to an embodiment of the present disclosure.
Figure 6A:
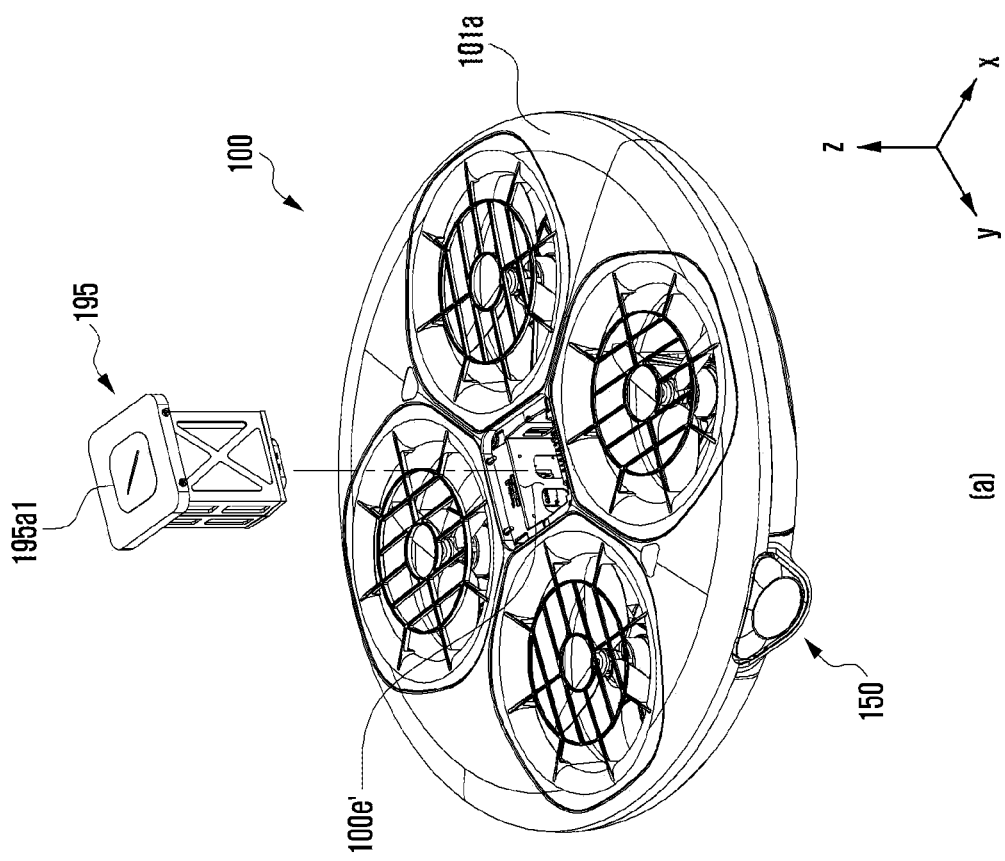
Figure 6B:
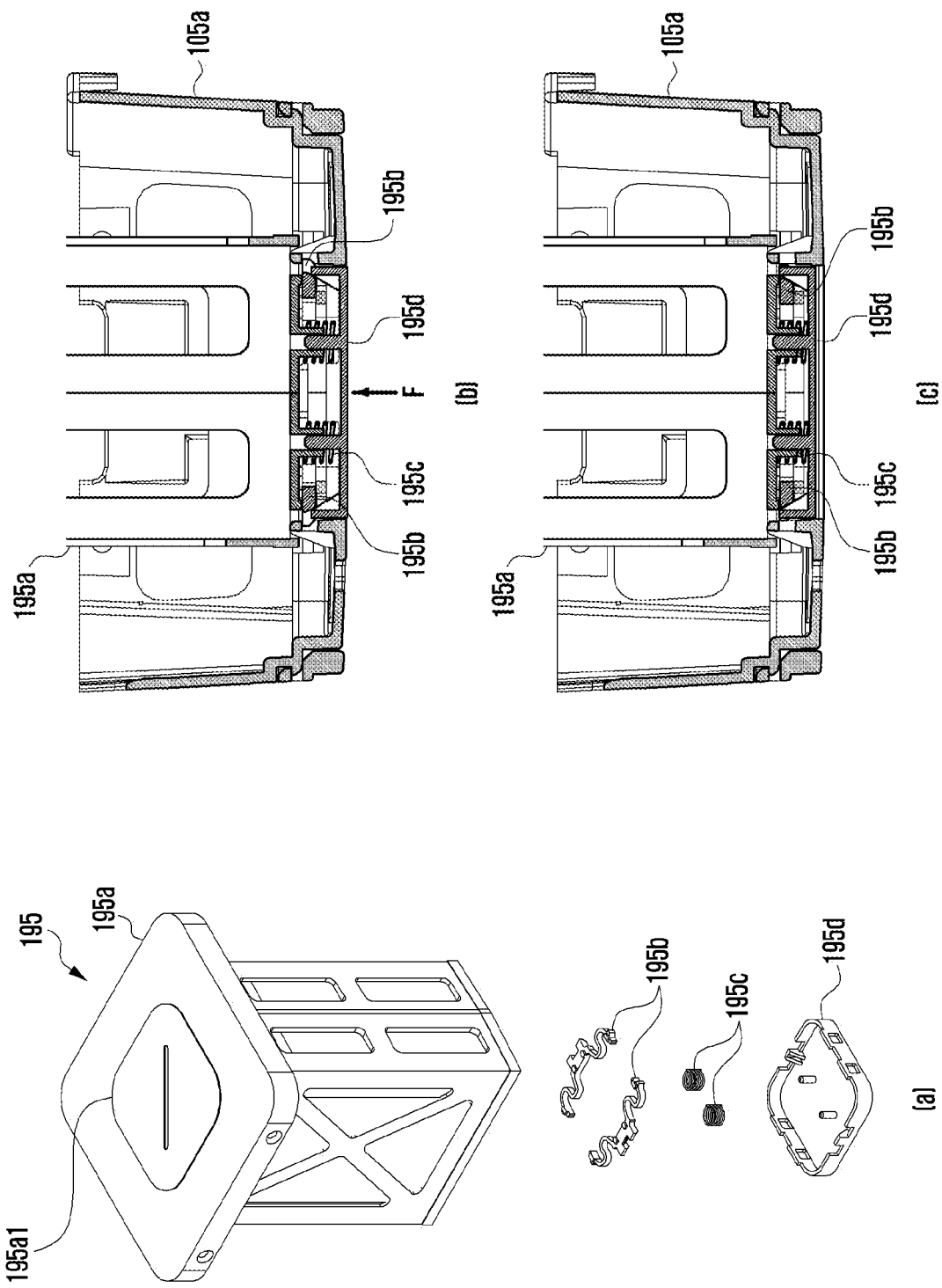

FIGS. 6A and 6B illustrate mounting and separation of a battery pack of an UAV according to an exemplary embodiment of the present disclosure.

With reference to FIGS. 6A and 6B, the battery 195 may be coupled to the central area 100e of the UAV 100 or may be separated from the central area 100e of the UAV 100. The battery 195 may be coupled to an opening 100e' of the central area 100e of the UAV 100 or may be separated from an opening 100e' of the central area 100e of the UAV 100. The battery 195 may be coupled to the central area 100e in consideration of weight balance of the UAV 100. The battery 195 may be coupled to the central area 100e in consideration of interference of the duct area 102 and the battery 195 in the UAV 100. Alternatively, the battery 195 may be coupled to the central area 100e in consideration of easy (or one touch) replacement from the UAV 100.

The battery 195 may include a battery pack 195a, elastic hook 195b, spring 195c, and cover 195d. An upper end surface of the battery pack 195a may be exposed (or may contact with external air) at the outside. At an upper end portion of the battery pack 195a, a power button 195a1 may be mounted. At a lower end portion of the battery pack 195a, the elastic hook 195b, the spring 195c, and the cover 195d may be positioned. One surface of the cover 195d may be exposed (or may contact with external air) at the outside.

The cover 195d may perform a linear motion (e.g., +/−z shaft direction) by a received external force (see FIG. 6B) and elasticity (see FIG. 6C) of the spring 195c, which is a reaction to an external force. The elastic hook 195b moving in a central shaft direction of the battery pack 195a by a linear motion of the cover 195d may release the battery pack 195a from the bracket 105a. When an external force is continuously provided to the cover 195d, the battery 195 released from the bracket 105a may move upward (e.g., +z shaft direction).

When an external force is removed from the cover 195d, the cover 195d may be returned (e.g., −z shaft direction) by elasticity of the spring 195c.

Figure 7:
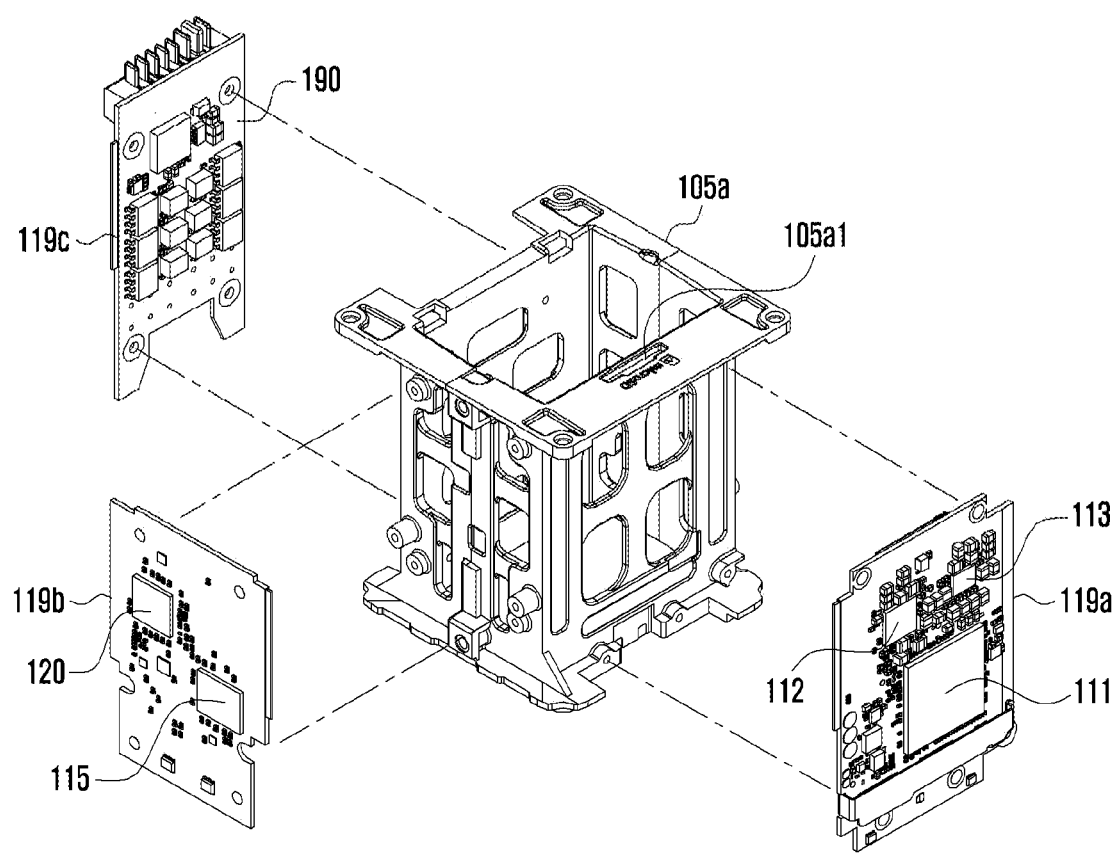
FIG. 7 illustrates a diagram of a printed board assembly (PBA) and a bracket of an UAV according to an embodiment of the present disclosure.

FIG. 7 illustrates a printed board assembly (PBA) and a bracket of an UAV according to an exemplary embodiment of the present disclosure.

With reference to FIG. 7, the PCBs 119a to 119c may be coupled (by a fastening member including a screw or an adhesive) to the bracket 105a positioned at the central area 100e of the UAV 100.

A plurality of constituent elements (e.g., processor, sensor processor, communication processor, resistor, and condenser) may be mounted in the PCBs 119a to 119c. A position of a plurality of constituent elements disposed at the PCBs 119a to 119c of FIG. 7 is an example and the present disclosure is not limited thereto (e.g., the communication processor 120 mounted in the PCB 119b may be mounted in the PCB 119a). The PCB 119 may be coupled to at least one surface of four surfaces of the bracket 105a.

The number of the PCBs coupled to the bracket 105a may be determined in consideration of weight balance in the UAV 100. A position of a plurality of (or one) PCBs coupled to the bracket 105a may be determined (e.g., various combinations of +x shaft direction, +y shaft direction, −x shaft direction or +x shaft direction, and −x shaft or −y shaft direction are available) in consideration of weight balance in the UAV 100. A weight of a plurality of (or one) PCBs coupled to the bracket 105a may be determined in consideration of weight balance in the UAV 100. A weight of a plurality of PCBs coupled to the bracket 105a may be different in consideration of weight balance in the UAV 100.

A size (e.g., a horizontal length×a vertical length) of a plurality of (or one) PCBs coupled to the bracket 105a may be determined in consideration of weight balance in the UAV 100. A size of each of a plurality of PCBs coupled to the bracket 105a may be different in consideration of weight balance in the UAV 100.

At the top of the bracket 105a, a slot 105a1 of a memory card (e.g., including an external memory such as a micro SD card and an SD card) may be positioned. When the battery 195 is mounted, the memory card slot 105a1 may be covered (or may not be exposed) by the battery 195.

Figure 8:
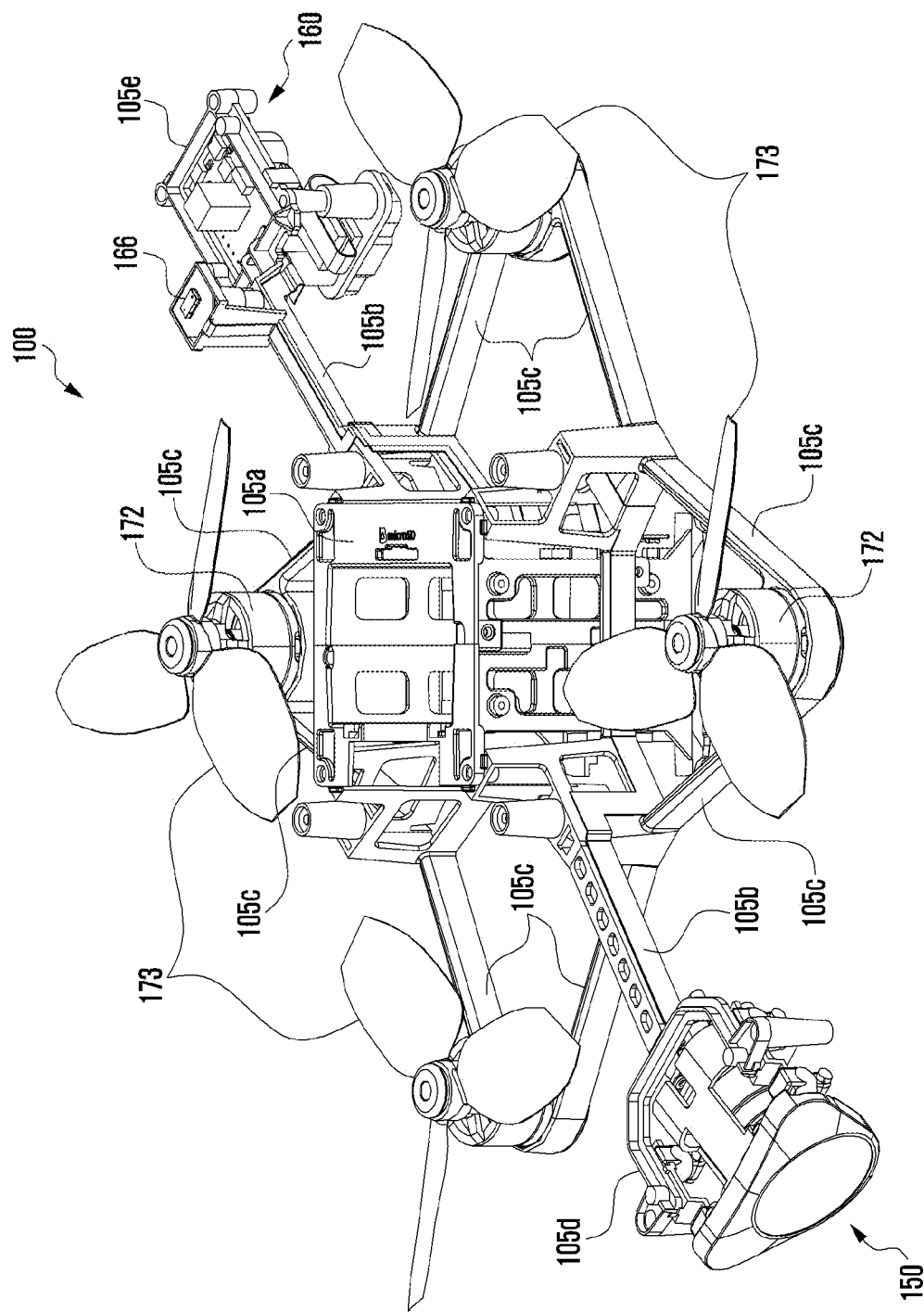
FIG. 8 illustrates a frame of an UAV according to an embodiment of the present disclosure.
Figure 9:
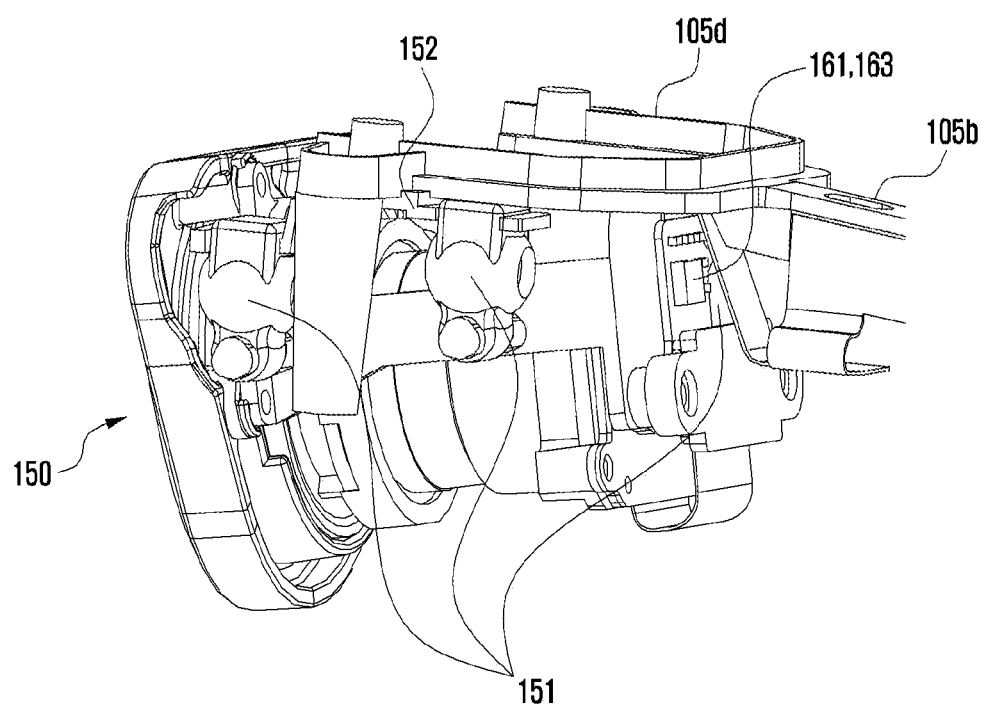
FIG. 9 illustrates a camera unit of an UAV according to an embodiment of the present disclosure.
Figure 10:
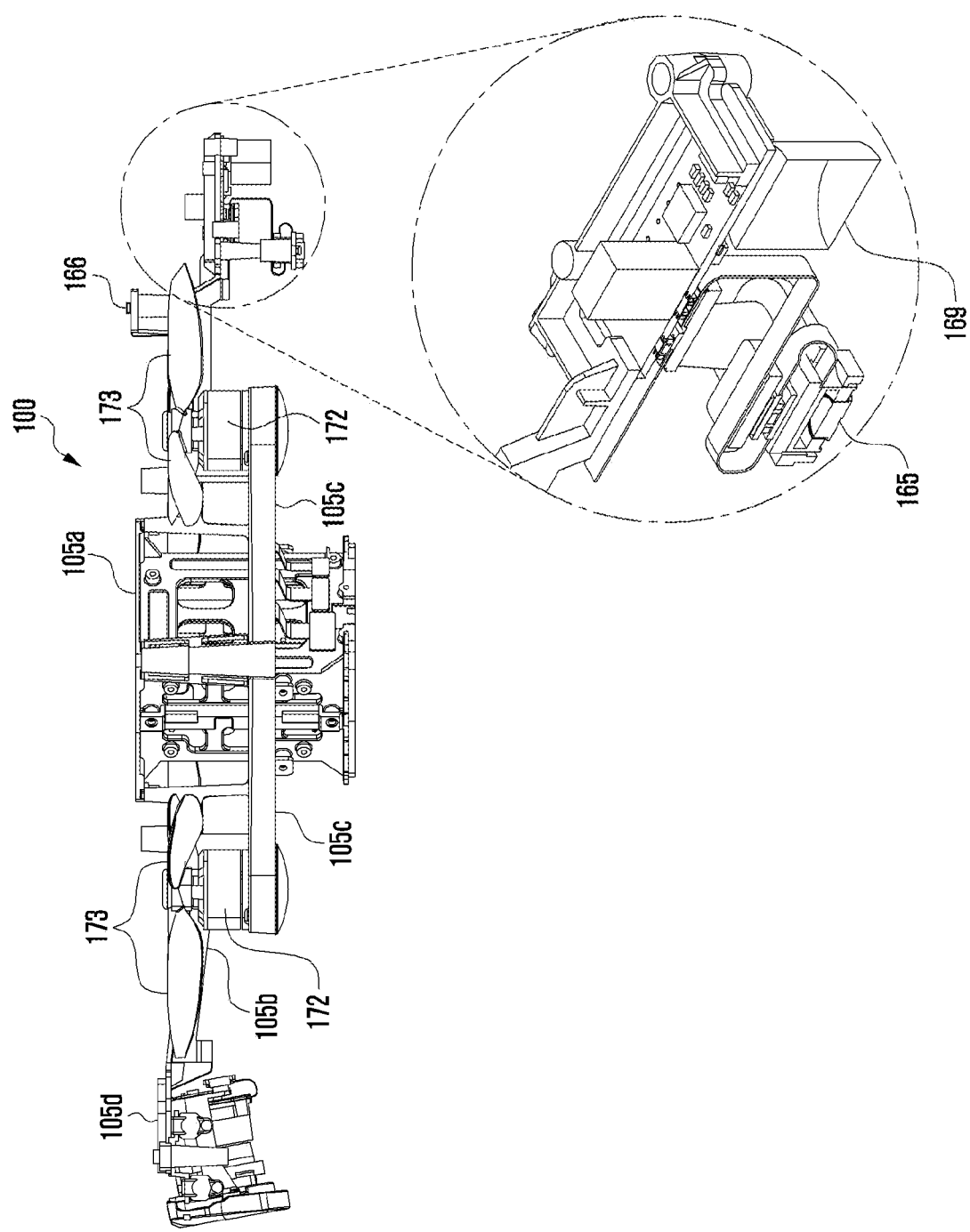
FIG. 10 illustrates a sensor unit of an UAV according to an embodiment of the present disclosure.

FIG. 8 illustrates a frame of an UAV according to an exemplary embodiment of the present disclosure. FIG. 9 illustrates a camera unit of an UAV according to an exemplary embodiment of the present disclosure. FIG. 10 illustrates a sensor unit of an UAV according to an exemplary embodiment of the present disclosure.

FIGS. 8 to 10 illustrate the frame 105 or 105a to 105e of the UAV 100. The frame 105 of the UAV 100 includes a bracket 105a and a processor 111, and a circuit board 119 coupled to the bracket 105a, the camera 150 coupled to one end (e.g., a camera fixing device 105d) of the bar 105b, the sensor 160 coupled to the other end (e.g., a sensor fixing device 105e) of the bar 105b, the motor 172 fixed to the 2-arm 105c, the propeller 173 coupled to a shaft of the motor 172, and the battery 195 coupled to the inside of the bracket 105a may be positioned at the frame 105. The constituent elements 105a to 195 each may be coupled (or may be fixed) to the frame 105 of the UAV 100.

The camera 150 may be connected to both ends of the U-shaped camera fixing device 105d positioned at one end of the bar 105b through a damper 151. The camera 150 may be coupled to each bracket 152 connected to the damper 151. A high frequency vibration generated in the motor 172 may be offset by the damper 151. A high frequency vibration generated in the motor 172 may be offset by the damper 151; thus, only a portion (or minimum portion) thereof may be transferred to the camera 150.

A plurality of sensors 161 to 167 corresponding to the flying control (or a flying performance) may be coupled (or fixed) to the frame 105 of the UAV 100. Alternatively, some of a plurality of sensors 161 to 167 corresponding to the flying control (or a flying performance) may be coupled (or fixed) to the housing 101 of the UAV 100.

The sensors 161 to 167 may be coupled at a position that has no influence on a vibration (or noise) occurring in the motor 172 and/or the propeller 173 of the UAV 100. Some sensors (the acceleration sensor 161 and the gyro sensor 163) of the plurality of sensors 161 to 167 may be coupled (or fixed) to the damper 151 of the camera 150. The sensor (another sensor (e.g., a magnetometer) other than the sensors 161 to 167) may be coupled (or fixed) to the damper 151 of the camera 150.

Some sensors (the optical flow sensor 160 or the ultrasonic sensor 167) of the plurality of sensors 161 to 167 may be coupled (or fixed) to a camera damper 169 of the optical flow sensor 160. Some sensors (the optical flow sensor 160 or the ultrasonic sensor 167) may be positioned opposite to the ground (e.g., −z shaft direction) of the UAV 100. Further, in order to prevent a collision with a ceiling or a wall of a room, the proximity sensor 166 may be positioned opposite to atmosphere (e.g., +z shaft direction) of the UAV 100.

Another sensor (e.g., a barometer that detects current altitude) other than the sensors 160, 166, and 167 may be coupled (or fixed) to the camera damper 169 of the optical flow sensor 160.

An UAV according to an exemplary embodiment includes a housing including an upper surface, lower surface, and side surface, wherein when a height of the housing is defined to a shortest length from a portion of the upper surface to a corresponding portion of the lower surface, the height of the housing reduces from the center of the housing toward an edge of the housing, and a first slope of the upper surface from the center of the housing to the edge of the housing is smaller than a second slope of the lower surface from the center of the housing to the edge of the housing; a plurality of through-holes formed from the upper surface to the lower surface and symmetrically disposed when viewed from the top of the upper surface, wherein the each through-hole includes an inlet, throat portion, and diffuser, wherein the throat portion is adjacent to the upper surface rather than the lower surface, the inlet has a reducing diameter from the upper surface toward the throat portion, and the diffuser has an increasing diameter from the throat portion toward the lower portion; a plurality of propellers each positioned at the throat portion or at a periphery of the throat portion within one of the through-holes and configured to rotate about a shaft vertical to a surface defined by the throat portion; a plurality of motors each positioned within the diffuser within any one of the through-holes and configured to operate the propellers, respectively; and a control circuit positioned within the housing and configured to control the motors.

In an exemplary embodiment, the UAV may further include first guards that cover the plurality of through-holes at the upper surface and second guards that cover the through-holes at the lower surface.

In an exemplary embodiment, the UAV may further include a battery separably inserted from the upper surface to the center of the housing.

In an exemplary embodiment, the each through-hole may include an internal wall made of a foam material.

In an exemplary embodiment, the foam material may include at least one of expanded polypropylene (EPP), expandable polystyrene (EPS), and latex.

In an exemplary embodiment, a rate of a diameter of the inlet of the upper surface to a diameter of the throat portion may be in a range between 1.15 and 1.30.

In an exemplary embodiment, the first slope may be in a range between 0° and 5°, and the second slope may be in a range between 5° and 15°.

An UAV according to an exemplary embodiment includes a frame configured to fix a motor; and a housing configured to enclose the frame, wherein the housing includes a top mesh corresponding to an upper surface thereof, a bottom mesh that covers a portion of a bottom surface thereof, and an middle part coupled to the top cover and the bottom cover, the housing has a plurality of duct areas that penetrate each of the top mesh, the bottom mesh, and the middle part, and the motor and a propeller connected to the motor and for rotating are positioned within the duct area.

In an exemplary embodiment, the duct area may be symmetrically positioned based on the frame.

In an exemplary embodiment, in the duct area, a tip of the propeller may be positioned at the middle part.

In an exemplary embodiment, the duct area may be divided into a bell mouth-shaped inlet, a throat continued in a bottom surface direction of the UAV in the inlet, and a diffuser continued in a bottom surface direction of the UAV in the throat, wherein the inlet may be formed in the top mesh.

In an exemplary embodiment, a diameter of the inlet may be changed according to a round surface.

In an exemplary embodiment, a diameter of the throat may linearly reduce from a start position of the throat.

In an exemplary embodiment, a diameter of the diffuser may linearly increase from a start position of the diffuser.

In an exemplary embodiment, a curvature of the top mesh may be different from that of the bottom mesh.

In an exemplary embodiment, the frame may include a central area, a plurality of bars extended in both directions from the central area, and a 2-arm extended from the central area, wherein a cross-section of the duct area may include a first cross-section adjacent to the central area; and a second cross-section farther than the first cross-section in the central area, and wherein a length of a diffuser of the first cross-section may be larger than that of a diffuser of the second cross-section.

In an exemplary embodiment, a length of an inlet of the first cross-section may be larger than that of an inlet of the second cross-section.

In an exemplary embodiment, at the central area, a battery may be mounted, and a portion of an upper surface and a bottom surface of the battery may be exposed to the outside.

In an exemplary embodiment, the UAV may include a camera connected to a fixing device positioned at one end of one bar of the plurality of bars through a damper, wherein at least one sensor may be coupled to the damper.

In an exemplary embodiment, the UAV may include a sensor positioned in a ground direction at one end of one bar of the plurality of bars.

According to an exemplary embodiment of the present disclosure, an UAV can prevent a user from contacting a propeller positioned within a housing.

Further, an UAV can prevent a user from contacting a propeller positioned within a duct area that penetrates a housing.

Further, an UAV can enhance lift through a sectional structure of a duct area that penetrates a housing.

Further, an UAV can enhance a flying performance by an upper surface curvature of a housing and a lower surface curvature of another housing.

Further, an UAV can reduce a housing weight by an upper surface curvature of a housing and a lower surface curvature of another housing.

Further, an UAV can mount a battery at a central area thereof.

Further, an UAV can have a PCB positioned adjacent to a battery mounted in a central area thereof.

Further, an UAV can enhance lift through a bell mouth-shaped inlet of a duct area that penetrates a housing.

Although the present disclosure has been described with various embodiments, various changes and modifications may be suggested to one skilled in the art. It is intended that the present disclosure encompass such changes and modifications as fall within the scope of the appended claims.

What is claimed is:

1. An unmanned aerial vehicle, comprising:
a housing comprising an upper surface, lower surface, and side surface, wherein when a height of the housing is defined to a shortest length from a portion of the upper surface to a corresponding portion of the lower surface, the height of the housing reduces from a center of the housing toward an edge of the housing, and a first slope of the upper surface from the center of the housing to the edge of the housing is smaller than a second slope of the lower surface from the center of the housing to the edge of the housing;
a plurality of through-holes formed from the upper surface to the lower surface and symmetrically disposed when viewed from a top of the upper surface, wherein each of the through-hole comprises an inlet, throat portion, and diffuser, wherein the throat portion is adjacent to the upper surface, the inlet includes a reducing diameter from the upper surface toward the throat portion, and the diffuser includes an increasing diameter from the throat portion toward a lower portion;
a plurality of propellers each positioned at the throat portion or at a periphery of the throat portion within one of the through-holes and configured to rotate by one of a plurality of motors;
the plurality of motors each positioned within the diffuser within any one of the through-holes and configured to operate respectively the each of the propellers; and
a control circuit positioned within the housing and configured to control the motors,
wherein the first slope being smaller than the second slope relates to an angle $\beta2$ being larger than an angle $\beta1$,
wherein the angle $\beta1$ being between a first imaginary line extended in a second cross-section direction from an inlet start point of a first cross-section and a second imaginary line that connects an inlet start point of a second cross-section to the inlet start point of the first cross-section, and
wherein the angle $\beta2$ being between a third imaginary line extended in the second cross-section direction from a diffuser end position of the first cross-section and a fourth imaginary line that connects a diffuser end position of the second cross-section to the diffuser end position of the first cross-section.

2. The unmanned aerial vehicle of claim 1, further comprising first guards that cover the plurality of through-holes at the upper surface and second guards that cover the through-holes at the lower surface.

3. The unmanned aerial vehicle of claim 1, further comprising a battery separably inserted from the upper surface to the center of the housing.

4. The unmanned aerial vehicle of claim 1, wherein the each of the through-holes comprises an internal wall made of a foam material.

5. The unmanned aerial vehicle of claim 4, wherein the foam material comprises at least one of expanded polypropylene (EPP), expandable polystyrene (EPS), or latex.

6. The unmanned aerial vehicle of claim 1, wherein a rate of a diameter of the inlet of the upper surface to a diameter of the throat portion is in a range between 1.15 and 1.30.

7. The unmanned aerial vehicle of claim 1, wherein the first slope is in a range between 0° and 5°, and the second slope is in a range between 5° and 15°.

8. The unmanned aerial vehicle of claim 1, wherein the housing comprises a central area, a plurality of bars extended in both directions from the central area, and a 2-arm extended from the central area,
  wherein a cross-section of each of the through-holes comprises:
    a first cross-section adjacent to the central area, and
    a second cross-section farther than the first cross-section in the central area, and
  wherein a length of a diffuser of the first cross-section is larger than that of a diffuser of the second cross-section.

9. The unmanned aerial vehicle of claim 8, wherein a length of an inlet of the first cross-section is larger than that of an inlet of the second cross-section.

10. The unmanned aerial vehicle of claim 8, wherein at the central area, a battery is mounted, and
  a portion of an upper surface and a bottom surface of the battery is exposed to the outside.

11. The unmanned aerial vehicle of claim 8, further comprising a camera connected to a fixing device positioned at one end of one bar of the plurality of bars through a damper,
  wherein at least one sensor is coupled to the damper.

12. The unmanned aerial vehicle of claim 8, further comprising a sensor positioned in a ground direction at one end of one bar of the plurality of bars.

* * * * *